(12) United States Patent
Kumon

(10) Patent No.: US 10,671,205 B2
(45) Date of Patent: Jun. 2, 2020

(54) OPERATING APPARATUS FOR VEHICLE

(71) Applicant: TOYOTA JIDOSHA KABUSHIKI KAISHA, Toyota-shi, Aichi-ken (JP)

(72) Inventor: Hitoshi Kumon, Aichi-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/718,902

(22) Filed: Sep. 28, 2017

(65) Prior Publication Data

US 2018/0095585 A1   Apr. 5, 2018

(30) Foreign Application Priority Data

Sep. 30, 2016  (JP) .................................. 2016-195103

(51) Int. Cl.
*G06F 3/041* (2006.01)
*G06F 3/0488* (2013.01)
(Continued)

(52) U.S. Cl.
CPC ............ *G06F 3/0416* (2013.01); *B60K 35/00* (2013.01); *B60K 37/06* (2013.01); *G01C 21/265* (2013.01);
(Continued)

(58) Field of Classification Search
CPC ...... G06F 3/0416; G06F 3/0487; G06F 3/147; G06F 3/04883; G06F 3/0484; G06F 3/1423; G06F 3/0488; G01C 21/3688; G01C 21/3664; G01C 21/20; G01C 21/265; G01C 21/36; B60K 37/06; B60K 2350/1012; B60K 2350/104; B60K 2350/355; B60K 2350/1044; B60K 2350/1028; B60K 2350/901; B60K 2350/1004; B60K 2350/352; B60K 2350/1068;
(Continued)

(56) References Cited

U.S. PATENT DOCUMENTS 5,923,307 A * 7/1999 Hogle, IV ........... G06F 3/04897
345/1.3
10,290,286 B2 * 5/2019 Hamaguchi ............ G01C 21/36
(Continued)

FOREIGN PATENT DOCUMENTS

DE    102013002891 A1    9/2014
JP    2001-280979 A       10/2001
(Continued)

*Primary Examiner* — Mihir K Rayan
(74) *Attorney, Agent, or Firm* — Hunton Andrews Kurth LLP

(57) ABSTRACT

An operating apparatus includes: a first display; a second display; and an electronic control unit. The electronic control unit is configured to output a second image onto the second display. The electronic control unit is configured to output a first image onto the first display. The electronic control unit is configured to switch between the first mode and the second mode. In a first mode, a first mode image independent of the second image is output as the first image. In the second mode, a second mode image having the same appearance as the second image is output as the first image. The electronic control unit is configured to execute a first predetermined function in the first mode and a second predetermined function in the second mode.

11 Claims, 22 Drawing Sheets

(51) Int. Cl.
*G01C 21/36* (2006.01)
*G06F 3/147* (2006.01)
*B60K 37/06* (2006.01)
*G01C 21/26* (2006.01)
*B60K 35/00* (2006.01)
*G06F 3/0487* (2013.01)

(52) U.S. Cl.
CPC ..... *G01C 21/3664* (2013.01); *G01C 21/3688* (2013.01); *G06F 3/0487* (2013.01); *G06F 3/04883* (2013.01); *G06F 3/147* (2013.01); *B60K 2370/11* (2019.05); *B60K 2370/122* (2019.05); *B60K 2370/141* (2019.05); *B60K 2370/145* (2019.05); *B60K 2370/146* (2019.05); *B60K 2370/148* (2019.05); *B60K 2370/1438* (2019.05); *B60K 2370/1442* (2019.05); *B60K 2370/1468* (2019.05); *B60K 2370/152* (2019.05); *B60K 2370/1529* (2019.05); *B60K 2370/182* (2019.05); *B60K 2370/184* (2019.05); *B60K 2370/52* (2019.05); *B60K 2370/55* (2019.05); *B60K 2370/577* (2019.05); *B60K 2370/736* (2019.05)

(58) Field of Classification Search
CPC ............ B60K 2350/1052; B60K 35/00; B60K 2370/11; B60K 2370/122; B60K 2370/141; B60K 2370/1438; B60K 2370/1442; B60K 2370/145; B60K 2370/146; B60K 2370/1468; B60K 2370/148; B60K 2370/15; B60K 2370/152; B60K 2370/1529; B60K 2370/182; B60K 2370/184; B60K 2370/52; B60K 2370/55; B60K 2370/577; B60K 2370/736; G06T 13/80; G09G 5/14; G09G 2360/04; G09G 2380/10
See application file for complete search history.

(56) References Cited

U.S. PATENT DOCUMENTS

| | | | |
|---|---|---|---|
| 10,346,118 B2* | 7/2019 | Kumon | G06F 3/04842 |
| 10,353,658 B2* | 7/2019 | Tsai | G06F 3/1423 |
| 2009/0256813 A1* | 10/2009 | Amici | B60K 35/00 345/173 |
| 2012/0013548 A1* | 1/2012 | Choi | B60K 35/00 345/173 |
| 2013/0215332 A1* | 8/2013 | Matsumoto | H04N 21/41422 348/738 |
| 2014/0009394 A1* | 1/2014 | Lee | H04N 5/4403 345/157 |
| 2014/0089847 A1* | 3/2014 | Seo | G06F 3/04842 715/800 |
| 2015/0153991 A1* | 6/2015 | Liang | G06F 3/1431 345/156 |
| 2015/0268840 A1 | 9/2015 | Leppanen et al. | |
| 2016/0046188 A1 | 2/2016 | Wild et al. | |
| 2017/0017312 A1* | 1/2017 | Shikata | G06F 3/0418 |
| 2017/0154608 A1 | 6/2017 | Hamaguchi | |
| 2017/0351422 A1 | 12/2017 | Wild et al. | |

FOREIGN PATENT DOCUMENTS

| | | |
|---|---|---|
| JP | 2016-004482 A | 1/2016 |
| KR | 20090060826 A | 6/2009 |
| KR | 1020150135780 A | 12/2015 |
| WO | 2015194111 A1 | 12/2015 |
| WO | 2016/102376 A1 | 6/2016 |

* cited by examiner

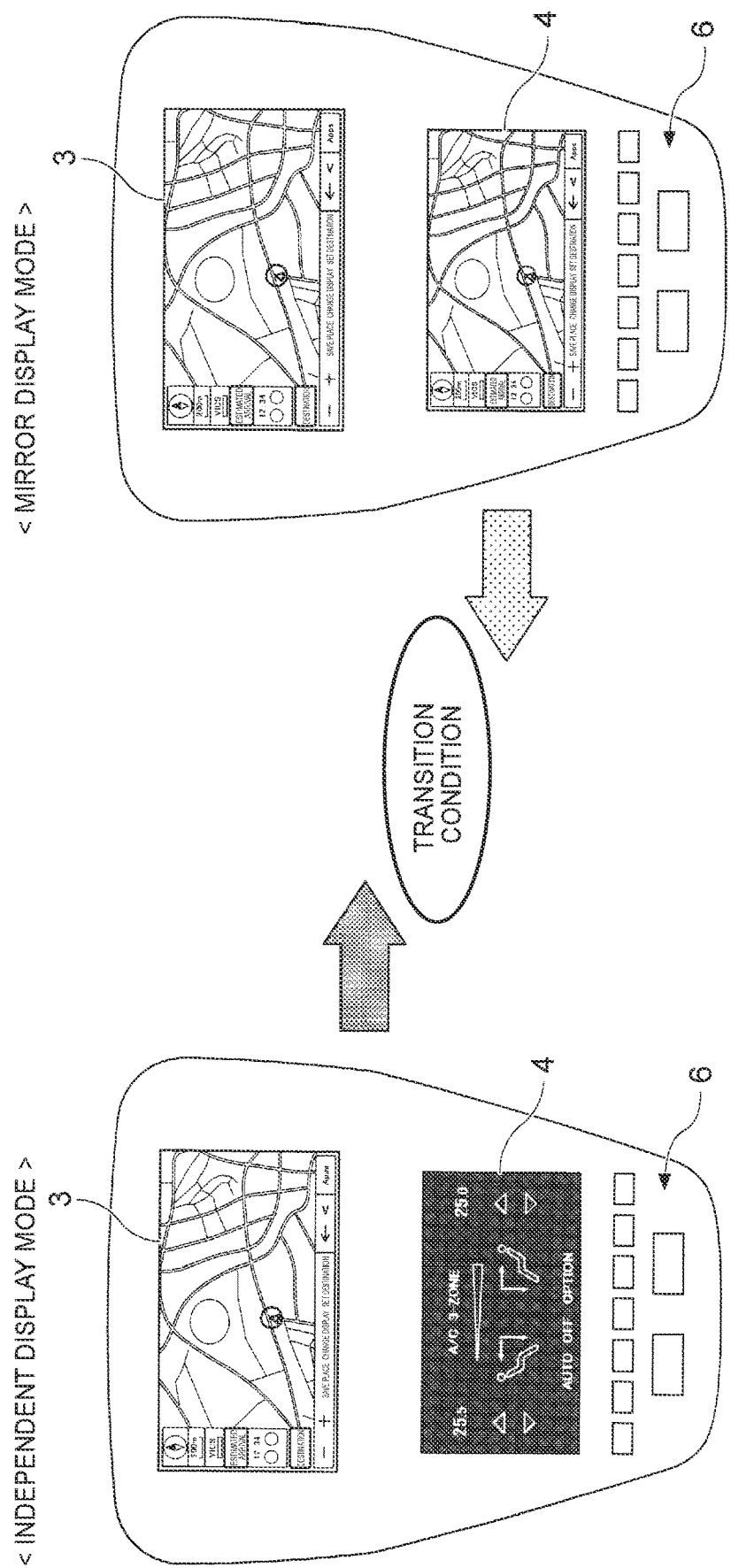

FIG. 6

IMAGE ID = 00001

| DEFINED PORTION ID | POSITION OF DEFINED PORTION | TYPE OF OPERATION INPUT | OPERATION SIGNAL | OUTPUT DESTINATION OF OPERATION SIGNAL |
|---|---|---|---|---|
| 00001 | (xx10~xx11,yy10~yy11) | TAP | DISPLAY CHANGE COMMAND A | MULTIMEDIA SYSTEM |
| 00003 | (xx30~xx31,yy30~yy31) | FLICK | DOWNWARD SCROLLING COMMAND | MULTIMEDIA SYSTEM |
| ... | ... | ... | ... | ... |

IMAGE ID = 00002

| DEFINED PORTION ID | POSITION OF DEFINED PORTION | TYPE OF OPERATION INPUT | OPERATION SIGNAL | OUTPUT DESTINATION OF OPERATION SIGNAL |
|---|---|---|---|---|
| 00002 | (xx20~xx21,yy20~yy21) | TAP | SET VALUE INCREASE COMMAND B & DISPLAY CHANGE COMMAND B | CAN (SET VALUE INCREASE COMMAND B) & DISPLAY CONTROL SECTION (DISPLAY CHANGE COMMAND B) |
| ... | ... | ... | ... | ... |

OPERATING APPARATUS FOR VEHICLE

INCORPORATION BY REFERENCE

The disclosure of Japanese Patent Application No. 2016-195103 filed on Sep. 30, 2016 including the specification, drawings and abstract is incorporated herein by reference in its entirety.

BACKGROUND

1. Technical Field

The present disclosure relates to an operating apparatus for a vehicle.

2. Description of Related Art

A technique of providing two displays, each of which has a touch panel, and outputting different images for a user interface onto the two displays has been known (for example, see Japanese Patent Application Publication No. 2016-004482 (JP 2016-004482 A)).

SUMMARY

When the two displays are used, a state where the display arranged on a relatively upper side (hereinafter referred to as an "upper display") and the display arranged on a relatively lower side (hereinafter referred to as a "lower display") output different images from each other can be realized, which improves convenience. For example, in a state where a navigation image is output onto the upper display and an image related to air conditioning setting is output onto the lower display, a user can perform an air conditioning operation on the lower display while being in a state of being able to constantly and visually recognize the navigation image, and thus feels convenience.

However, it is difficult with the technique as described above to provide a user interface that uses the two displays and is superior in both of operability and convenience. For example, in the related art as described above, while the image output on each of the lower display and the upper display is set to be the same, a function related to said image cannot be realized by an operation on the lower display. In regard to this point, for example, the operability is improved when a navigation operation can be performed on the lower display while the navigation image can visually be recognized on the upper display, the visibility of which is relatively high.

The disclosure provides a user interface that uses two displays and is superior in both of operability and convenience.

An aspect of the disclosure provides an operating apparatus for a vehicle. The operating apparatus according to the aspect includes a first display having a touch panel and mounted on the vehicle, a second display arranged at a position higher than the first display and away from a driver's seat of the vehicle compared to the first display, and an electronic control unit. The electronic control unit is configured to output a second image onto the second display. The electronic control unit is configured to output a first image onto the first display. The electronic control unit has a first mode and a second mode. The electronic control unit is configured to switch between in the first mode and in the second mode based on mode switching input from a user. The first mode is a mode in which a first mode image independent of the second image is output as the first image. The second mode is a mode in which a second mode image having the same external appearance as the second image is output as the first image. The electronic control unit is configured to execute, when the electronic control unit is in the first mode, a first predetermined function related to the first mode image, based on operation input on the touch panel. The electronic control unit is configured to execute, when the electronic control unit is in the second mode, a second predetermined function related to the second image or the second mode image based on the operation input on the touch panel.

According to this aspect, in the first mode, the first mode image, which is independent of the second image output onto the second display is output onto the first display. In the second mode, the second mode image, which has the same external appearance as the second image output onto the second display, is output onto the first display. Accordingly, in the first mode, the first mode image on the first display is output in an aspect of not being dependent on the second image output onto the second display. In the second mode, the second mode image on the first display is output in an aspect of being changed in accordance with the second image output onto the second display. Here, "the second mode image having the same external appearance as the second image" indicates such an aspect that a slight difference in the external appearance between the second mode image and the second image is permitted and main sections of the images have the same external appearance. The slight difference in the external appearance can be, for example, such a difference that an operation item display provided around the second mode image is not provided in the second image, such a difference that a cursor or pointer display not provided in the second mode image only exists in the second image, such a difference that brightness or contrast only differs, or the like. Note that the second image may include the navigation image. Accordingly, for example, the user (for example, a driver) can look at the navigation image on the second display with superior visibility to the first display.

In addition, according to this aspect, the electronic control unit is switched between the first mode and the second mode on the basis of the mode switching input by the user. Accordingly, the electronic control unit can be switched between the first mode and the second mode when the user makes the mode switching input, and thus convenience of the operating apparatus for the vehicle is improved. Switching between the first mode and the second mode is accompanied with switching between the first mode image and the second mode image on the first display. Accordingly, by looking at switching between the first mode image and the second mode image on the first display, the user can visually understand switching between the modes and thus becomes intuitively familiar with such switching.

In addition, according to this aspect, the user can realize the first predetermined function (for example, a change of a setting value or the like) related to the first mode image by the operation input on the first display in the first mode. In this way, in the first mode, the user can perform an operation related to the first mode image, which is independent of the second image, on the first display while maintaining the second image in a visually recognizable state on the second display with relatively high visibility. Accordingly, in the first mode, regardless of a type of the operation performed on the first display during traveling, the user can maintain the navigation image in the visually recognizable state on the second display with the superior visibility to the first display, and thus favorable convenience of the operating apparatus for the vehicle can be realized.

In addition, according to this aspect, in the second mode, the user can realize the second predetermined function by the operation input on the first display. The second predetermined function may be a function related to either one of the second image and the second mode image. Here, this is because the user does not mix up realization of the function related to the second mode image with realization of the function related to the upper image in the second mode when the second image and the second mode image has the same external appearance. Note that, when the second image is the navigation image (and when the second mode image has the same external appearance as said navigation image, or the like in conjunction therewith), the second predetermined function is a function related to the navigation image. Accordingly, in the second mode, the user can perform the navigation operation on the first display while looking at the navigation image on the second display with the relatively high visibility or looking at the corresponding navigation image (the second mode image) on the first display. In addition, the first display is provided at a position that is lower than the second display and is closer to the driver's seat. Thus, compared to a case where a touch panel is provided in the second display and the operation related to the second image is performed on the second display, operability is improved.

In addition, according to this aspect, the user can perform the operation on the first display with the relatively favorable operability in both of the first mode and the second mode. In this way, an operation system with which the user who is accustomed to the operation on an "existing single display with a touch panel" is easily familiarized can be realized.

In the aspect of the disclosure, the mode switching input may include predetermined input on the touch panel.

According to this aspect, the driver can make the mode switching input without directly looking at the first display. Thus, movement of the driver's line of sight from the front can be suppressed when the driver makes the mode switching input.

In the aspect of the disclosure, the electronic control unit may be configured to execute animation processing. The animation processing may include continuous output of a composite image in which one of the first mode image and the second mode image is partially hidden by the other, over plural frame cycles. The animation processing may include first animation processing executed prior to switching between the first mode and the second mode. Along with a lapse of time from a time point at which the first animation processing is started, the electronic control unit may be configured to realize one of (i) changing the composite image over the plural frame cycles and then outputting the second mode image with gradually reducing a display range of the first mode image and gradually displaying the second mode image when the first mode image is displayed before the electronic control unit is switched between in the first mode and in the second mode, and (ii) changing the composite image over the plural frame cycles and then outputting the first mode image with gradually reducing a display range of the second mode image and gradually displaying the first mode image when the second mode image is displayed before the electronic control unit is switched between in the first mode and in the second mode.

According to this aspect, the composite image is changed along with a lapse of time by the first animation processing that precedes switching between the first mode and the second mode. Accordingly, occurrence of switching from the first mode to the second mode and switching of the reversal thereof can visually and easily be understood.

In the aspect of the disclosure, the predetermined input may include: first input accompanied with finger movement in a first direction; and second input accompanied with finger movement in a reverse direction from the first direction. The first input may cause switching from the first mode to the second mode. The second input may cause switching from the second mode to the first mode. The electronic control unit may be configured to execute the animation processing to continuously output a composite image over plural frame cycles. The composite image may have: a part of the first mode image in the first direction from a boundary extending perpendicularly to the first direction; and a part of the second mode image in the reverse direction from the boundary. The boundary may be on the composite image. The animation processing may include second animation processing to change the composite image, over the plural frame cycles, in an aspect that the boundary in the composite image moves in the first direction or the reverse direction in an interlocking manner with the finger movement in the first direction or with the finger movement in the reverse direction, on the touch panel.

According to this aspect, the user can realize switching from the first mode to the second mode and switching of reversal thereof by respectively making the first input and the second input in different directions from each other. In addition, because the boundary in the composite image interlocks with the finger movement, occurrence of switching from the first mode to the second mode or switching of the reversal thereof can visually and easily be understood when continuing said finger movement.

In the aspect of the disclosure, the animation processing may be based on: a door model or a shutter model in which the first mode image makes translational movement, within a screen of the first display or out of the screen, while adopting an first aspect of a door or a shutter at least covering a part of the second mode image; or a roll-up-curtain model in which the second mode image is expanded within the screen or rolled up to the outside of the screen, while adopting an second aspect of a roll curtain at least covering a part of the first mode image.

According to this aspect, due to the model using the door, the shutter, or the like with which the user is familiar from his/her life, understanding of a layer relationship between the first mode image and the second mode image is facilitated, and intuitive understanding of a relationship between the first mode image and the second mode image (and a relationship between the first mode and the second mode) by the user can be promoted.

In the aspect of the disclosure, the electronic control unit may be configured to switch from the second mode to the first mode, when the electronic control unit is in the second mode and the operation input is not made on the second mode image for a predetermined time or longer.

According to this aspect, automatic recovery from the second mode to the first mode is realized with no operation. Accordingly, the user no longer has to perform a special switching operation for switching from the second mode to the first mode, and thus the convenience is improved.

In the aspect of the disclosure, the electronic control unit may be configured to generate the second mode image based on a video signal generated by the electronic control unit.

According to this aspect, the second mode image can be generated by using the video signal generated by the electronic control unit. In this way, software that is used for the electronic control unit to draw the second mode image becomes unnecessary or simplified. In addition, as software for generation of the video signal by the electronic control unit, existing software that is used by a multimedia system including a navigation device can be used as is or by making a few modifications. Thus, development man-hour of the software can be reduced.

In the aspect of the disclosure, the second display may not have a touch panel.

In the aspect of the disclosure, the first direction may be an up direction or a down direction in the vehicle up-down direction of the vehicle.

In the aspect of the disclosure, the second image may include a navigation image.

According to this aspect, the second display can be used exclusively for a display purpose and thus can be arranged at a position with the superior visibility without considering operability thereof. In addition, because a difference in roles of the first display and the second display is clarified, the user interface with which the user can easily familiarized can be provided.

According to the disclosure, the user interface with both of the superior operability and the superior convenience can be provided by using the two displays.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a state transition view that illustrates one example of a transition condition between an independent display mode and a mirror display mode;

FIG. 6 includes tables, each of which illustrates one example of graphical user interface (GUI) information;

DETAILED DESCRIPTION OF EMBODIMENTS

A detailed description will hereinafter be made on each embodiment with reference to the accompanying drawings.

In the following description, an "image" is a concept that includes video. That is, the video is a type of the image.

Figure 1:
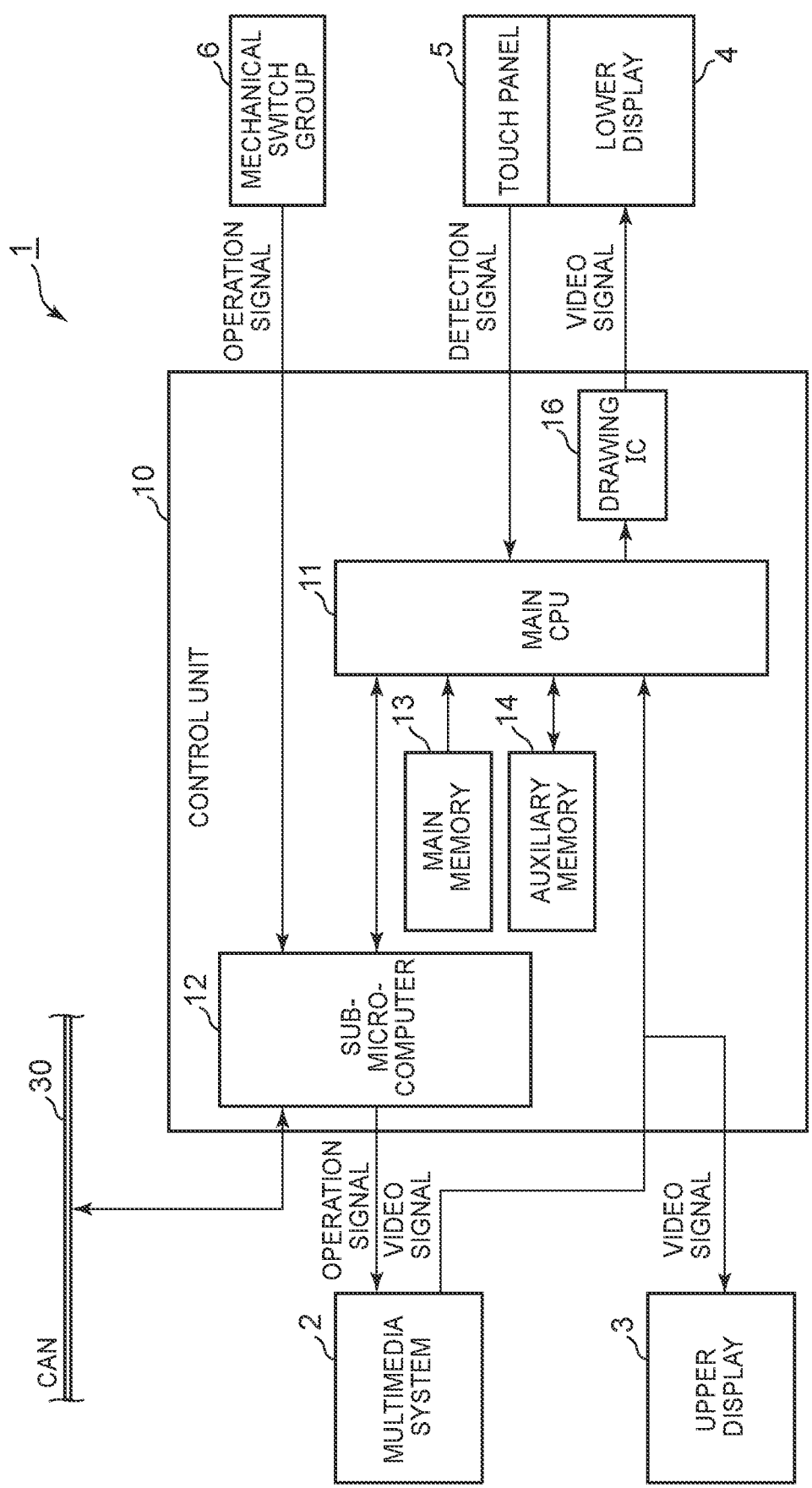
FIG. 1 is a view of one example of an operating apparatus 1 for a vehicle according to an embodiment.
Figure 2:
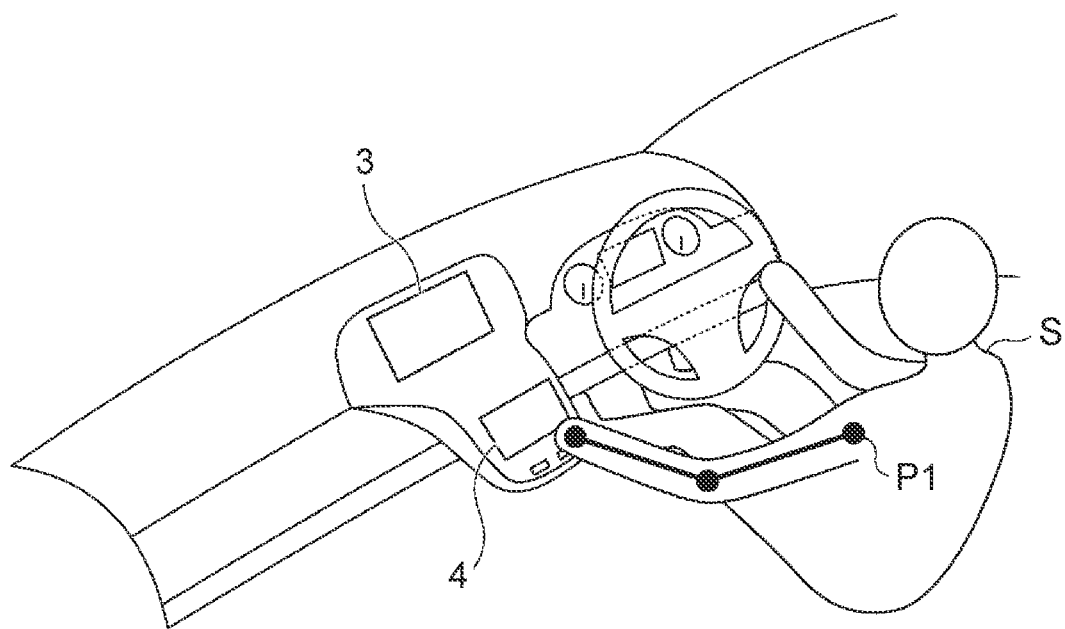
FIG. 2 is a view of one example of installation states of an upper display 3 and a lower display 4.

FIG. 1 is a view of one example of an operating apparatus 1 for a vehicle according to an embodiment. FIG. 2 is a view of one example of installation states of an upper display 3 and a lower display 4.

As shown in FIG. 1, the operating apparatus 1 for the vehicle includes a multimedia system 2, the upper display 3 (one example of the second display), the lower display 4 (one example of the first display), a touch panel 5, a mechanical switch group (a hardware switch group) 6, and a control unit 10.

The multimedia system 2 includes various multimedia devices such as a navigation device, an audio device, and a TV tuner. Note that the multimedia system 2 includes a computer (not shown) as a hardware resource, and one example of the "second display control section" in the claims can be realized by processing (program execution processing) by the computer in the multimedia system 2.

The multimedia system 2 outputs an image (hereinafter also referred to as an "upper image") onto the upper display 3. The upper image is one example of the second image. The multimedia system 2 outputs the upper image, which is selected from plural types of the upper images, onto the upper display 3. Note that the output upper image of the plural types is basically selected by a user (for example, a driver) but may automatically be selected by default in a particular case.

In this embodiment, as one example, the multimedia system 2 outputs the upper image, which is selected from the plural types of the upper images used for an operation of the multimedia system 2, onto the upper display 3. More specifically, the plural types of the upper images include a navigation image, images related to the audio device (an image indicative of the track number and the like, videos played by various media, and the like), video of a TV broadcast, images related to a phone call and emails, and the like. The plural types of the upper images may have a layer structure with the images on a lower layer per type. For example, the navigation image may have the layer structure with a map image in a top layer and an image for setting a destination, an image for display setting of a peripheral facility, and the like in the lower layer. Note that screen transition related to the upper image hereinafter means a concept that includes transition between the types of the upper images and transition between the layers in the same type of the images.

The multimedia system 2 generates a video signal related to the upper image that is output onto the upper display 3 and provides said video signal to the upper display 3 and the control unit 10. For example, in a state of outputting the map image as the navigation image onto the upper display 3, the multimedia system 2 generates the video signal used to update the map image in accordance with a change of a current position of the vehicle. In this embodiment, as one example, as shown in FIG. 1, the video signal is once received by the control unit 10 and is then provided to the upper display 3. However, the multimedia system 2 may separately provide the video signal to the control unit 10 and the upper display 3.

The multimedia system 2 receives an operation signal from the control unit 10. The operation signal is generated in accordance with input in the mechanical switch group 6 and operation input on the touch panel 5 (operation input corresponding to a specifically defined portion, which will be described below). Based on the received operation signal, the multimedia system 2 executes processing that corresponds to said operation signal. For example, in accordance with the operation signal, the multimedia system 2 executes various types of the processing including the screen transition from the navigation image to another type of the image (for example, the image related to the audio device), enlargement of a map in the navigation image, and a route search, for example, generates the video signal based on a processing result, and provides said video signal to the control unit 10 and the upper display 3.

The upper display 3 is a display such as a liquid-crystal display. In this embodiment, as one example, the upper display 3 is an on-board display. In this embodiment, differing from the lower display 4, the upper display 3 does not include the touch panel. In this way, cost of the upper display 3 (cost related to the touch panel) can be cut, and freedom in arrangement of the upper display 3 is increased (because operability thereof does not have to be considered). However, in a modified example, the upper display 3 may include the touch panel.

The upper display 3 is arranged at a position that is higher than the lower display 4 in an up-down direction of the vehicle and is far from a driver's seat. As shown in FIG. 2, the upper display 3 is provided at the position where visual recognition by a driver S during driving is easy. Note that a distance from the driver's seat can be determined from a distance from a shoulder point P1 of the driver S (a design value). Meanwhile, as shown in FIG. 2, the lower display 4 is arranged at a position where the driver S during driving can easily operate by stretching his/her arm. Note that, in the case where a distance (a reach distance) from the shoulder point P1 of the driver S (FIG. 2) is the same, the lower display 4 is positioned to be the lowest as possible. This is because a muscle load during the operation can be reduced, and thus positioning at the lowest position is advantageous from a perspective of the operability during driving. Meanwhile, from a perspective of visibility during driving, positioning of the lower display 4 becomes disadvantageous as the lower display 4 is positioned to the lower position. As will be described below, the navigation image is possibly output as a mirror display mode image (will be described below) onto the lower display 4. Thus, in order to secure the visibility that is required for the map image, the lower display 4 is preferably arranged at a position where a depression angle from a viewpoint of the driver S (a downward depression angle with respect to a horizontal plane) does not become significantly larger than 30 degrees. Note that, in the example shown in FIG. 2, the upper display 3 is incorporated in an instrument panel but may be placed on top of the instrument panel.

As shown in FIG. 1, the upper display 3 directly receives the video signal from the multimedia system 2 (that is, without interposing the processing in control unit 10). The upper display 3 displays the upper image based on the video signal received from the multimedia system 2.

The lower display 4 is a display such as the liquid-crystal display. In this embodiment, as one example, the lower display 4 is the on-board display.

The touch panel 5 is provided in the lower display 4. That is, the lower display 4 is the display with the touch panel. An input detection method of the touch panel 5 is of an electrostatic type but may be of a pressure sensitive type or may be of another type such as a combination of the electrostatic type and the pressure sensitive type. The touch panel 5 provides the control unit 10 with a detection signal indicative of a variation of electrostatic capacity at each position on the touch panel 5.

The mechanical switch group 6 is provided in design panel switches incorporated in the instrument panel, for example. The mechanical switch group 6 is provided around the lower display 4, for example (see FIG. 5). The mechanical switch group 6 includes a multimedia system switch, a vehicle control system switch, and a top switch (a switch used to return to an independent display mode, which will be described below), for example. The multimedia system switch is a switch used for the operation of the multimedia system 2 and may include a map switch for retrieving the navigation image, a destination switch for retrieving an operation image used to set the destination, and the like, for example. The vehicle control system switch is a switch for various operations such as an operation of an air conditioner (an air conditioning operation), selection of a travel control mode, setting of a travel assist device (such as clearance sonar), a rear seat operation, and an operation of an electric rear sun shade. The operation signal that is generated through the operation of the mechanical switch group 6 by the user is received by the control unit 10.

The control unit 10 is formed by including the computer. For example, the control unit 10 is an electronic control unit (ECU). The control unit 10 is connected to the multimedia system 2, the upper display 3, the lower display 4, the touch panel 5, and the mechanical switch group 6 and is connected to various types of electronic components in the vehicle via a controller area network (CAN) 30. Note that the electronic components, to which the control unit 10 is connected via the CAN 30, include an air conditioner ECU (not shown) that controls the air conditioner (not shown).

The control unit 10 includes a main central processing unit (CPU) 11, a sub-microcomputer 12, main memory 13, auxiliary memory 14, and a drawing integrated circuit (IC) 16. Note that the main CPU 11 and the sub-microcomputer 12 may be integrated.

Figure 3:
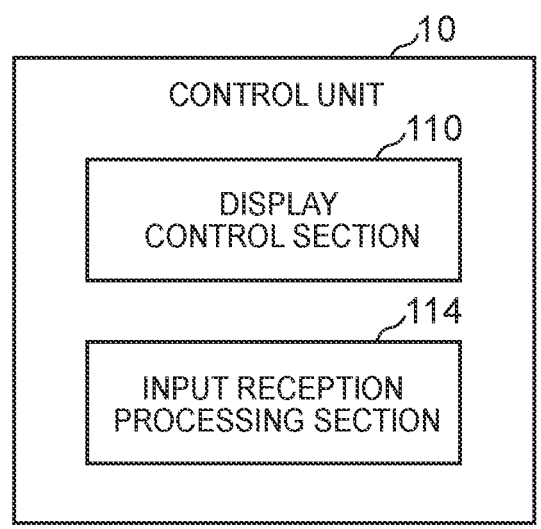
FIG. 3 is a view of one example of a functional block of a control unit 10.

FIG. 3 is a view of one example of a functional block of the control unit 10.

The control unit 10 includes a display control section 110 (one example of the first display control section) and an input reception processing section 114. The display control section 110 can be realized by processing of the drawing IC 16 and processing of the main CPU 11 (the program execution processing). The input reception processing section 114 can be realized by the processing of the main CPU 11 and the sub-microcomputer 12 (the program execution processing).

The display control section 110 outputs the image (hereinafter referred to as a "lower image") onto the lower display 4. The lower image includes an image for the user interface (hereinafter also referred to as a "lower GUI image"). In this embodiment, as one example, the lower image selectively includes the lower GUI image and a composite image (see FIG. 8B and FIG. 10B) that is generated in association with animation processing, which will be described below.

One or more functions are associated with the image for the user interface, such as the lower GUI image. In addition, the one or more functions are respectively associated with predetermined positions on the image for the user interface. Note that the function associated with the image for the user interface is determined in accordance with external appearance of said image. In other words, when the association of a certain function with the image is desired, said image is usually provided with the external appearance that is associated with said function. In this embodiment, as one example, the image for the user interface has defined portions that are respectively associated with the operation input and the function of the touch panel 5. The defined portion is a part or a whole of the image and is a portion for which the operation input received by said defined portion and the function to be realized in response to said operation input are defined. In the defined portion, an operation item display is typically drawn. That is, the defined portion corresponds to a drawing range of the operation item display for which a letter, an illustration, or the like indicative of the associated function is provided. The operation item display possibly adopts a mode of a switch that includes: a setting switch for various types of setting (volume adjustment, temperature adjustment, and the like) of an operation target device such as the multimedia system 2 or the air conditioner (not shown); a switch for the particular screen transition; a scrolling switch for screen scrolling or list scrolling; and a selection switch for selection of an input key such as a letter or the number, a list, or the like, for example. Alternatively, the operation item display possibly adopts a mode of an icon or launcher that activates a particular application.

However, the defined portion is not limited to the drawing range of the operation item display. For example, the defined portion can be a region where movement within the map image is realized by the drag (for example, a portion in which scrolling of the map image is realized when the portion is dragged), a portion in which reduction/enlargement of the map image is realized when the portion is pinched in/out, or a portion as a part of a TV clip (for example, a portion in which the screen transition to a TV setting image is realized when the portion is tapped).

The operation input and the function that are associated with the defined portion are prescribed in advance per lower GUI image output onto the lower display 4 and per defined portion (for example, see GUI information shown in FIG. 6, the GUI information shown in FIG. 6 will be described below).

The display control section 110 has: the independent display mode (one example of the first mode) in which an independent display mode image (one example of the first mode image) is output; and a mirror display mode (one example of the second mode) in which the mirror display mode image (one example of the second mode image) is output. In the independent display mode, the independent display mode image is the lower GUI image. In the mirror display mode, the mirror display mode image is the lower GUI image. Each of the independent display mode image and the mirror display mode image is one example of the first image. One example of a transition condition between the independent display mode and the mirror display mode will be described below with reference to FIG. 5.

The independent display mode image is an image that is independent of the upper image output onto the upper display 3. Accordingly, in the independent display mode, even when the upper image output onto the upper display 3 is changed, the independent display mode image is not changed by said change. For example, the independent display mode image is an image that is never output onto the upper display 3. Only one type of the independent display mode image may be provided; however, in this embodiment, as one example, plural types of the independent display mode images are provided. Of the plural types of the independent display mode images, the independent display mode image that is output onto the lower display 4 can be selected by the user. The plural types of the independent display mode images are, for example, the operation images of the vehicle control system and include an image for the air conditioning operation, an image for selection of the travel control mode, an image for setting of the travel assist device, the operation images of the rear seat operation and the electric rear sun shade, and the like. In addition, for example, the independent display mode image may have a menu image as a home image and have a layer structure in which various images, such as the image for the air conditioning operation and the image for the selection of the travel control mode, are prepared in parallel on a lower layer of the home image. Furthermore, in regard to the various images such as the image for the air conditioning operation, the independent display mode image may also have a layer structure with images on a further lower layer.

Figure 4A:
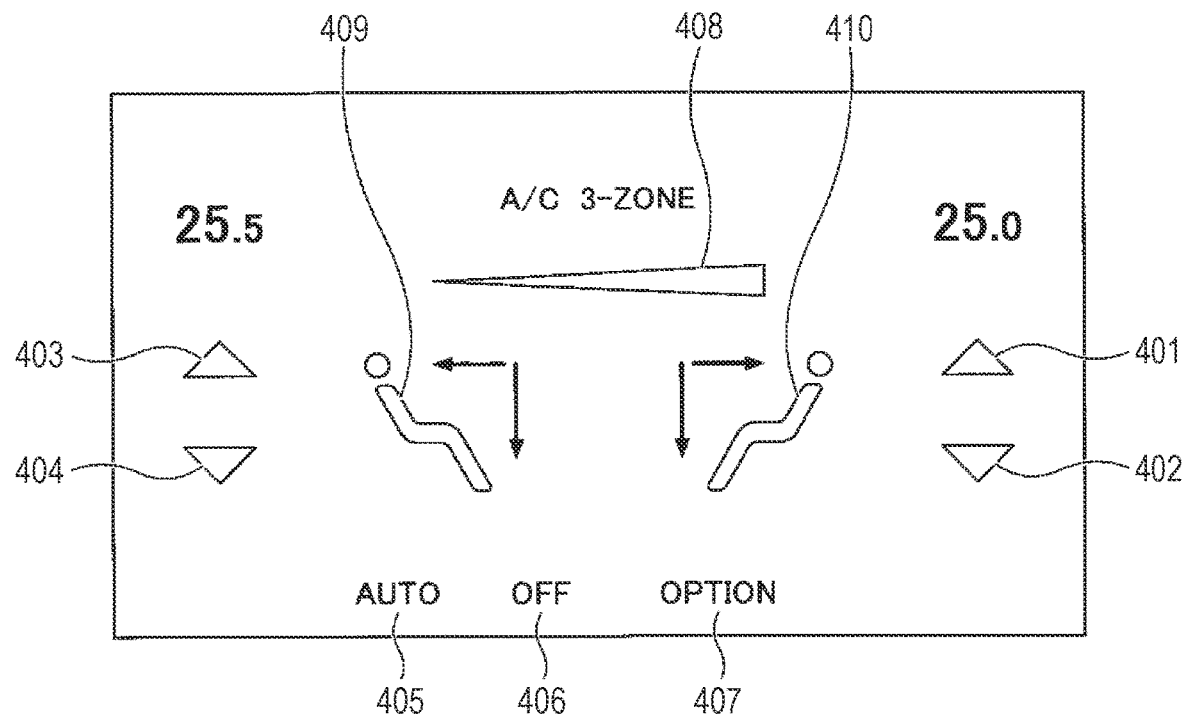
FIG. 4A is a view of one example of an independent display mode image.

Functions that differ from the functions related to the upper image are associated with the independent display mode image. In this embodiment, the functions that are respectively associated with the defined portions in the independent display mode image include various functions of the vehicle control system. For example, the various functions that are respectively associated with the defined portions in the independent display mode image may include: various functions that can be realized by the vehicle control system switch of the mechanical switch group 6; and further various functions (the various functions of the vehicle control system) that cannot be realized by the vehicle control system switch. FIG. 4A is a view of one example of the independent display mode image. In the example shown in FIG. 4A, the independent display mode image is the image for the air conditioning operation, and the operation item displays 401 to 410 for the various setting are provided.

The mirror display mode image has the same external appearance as the upper image that is (currently) output onto the upper display 3. Accordingly, in the mirror display mode, when the upper image that is output onto the upper display 3 is changed, the mirror display mode image is changed in response to said change. Note that the mirror display mode image is possibly reduced (or enlarged) at a specified ratio with respect to the upper image in accordance with a difference in screen size between the upper display 3 and the lower display 4.

Figure 4B:
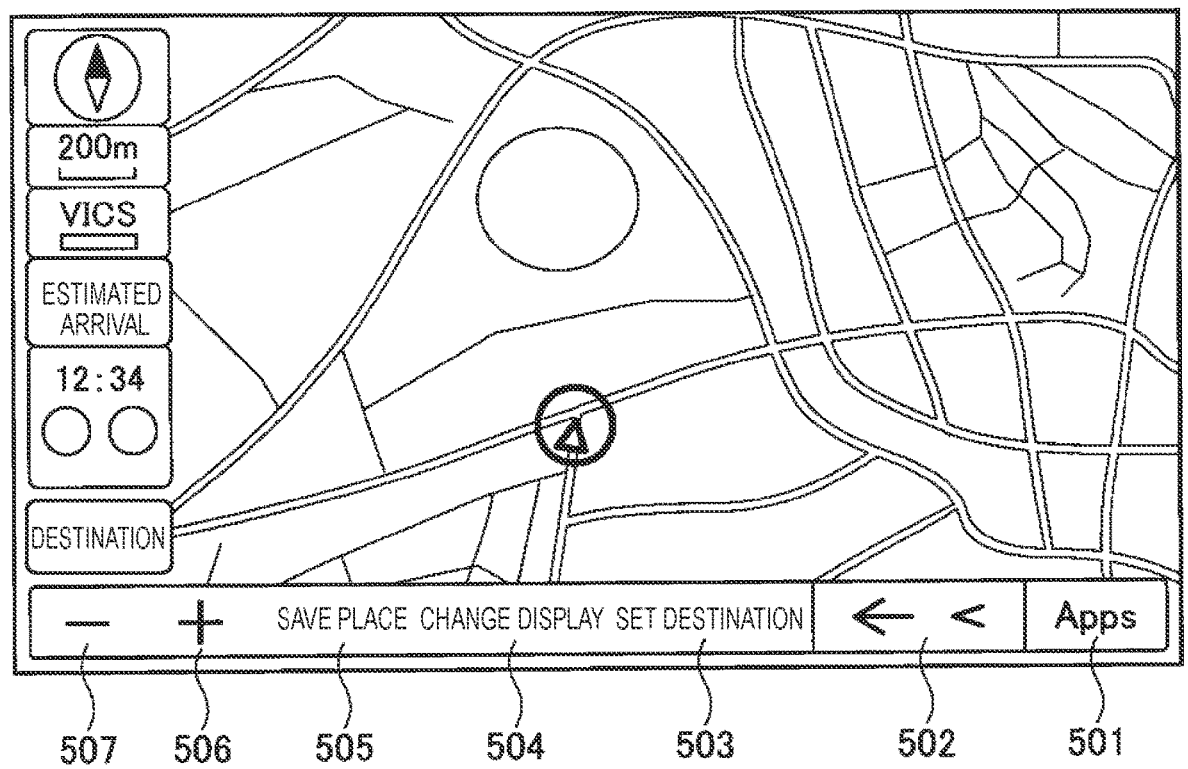
FIG. 4B is a view of one example of a mirror display mode image.

Functions related to the corresponding upper image are associated with the mirror display mode image. That is, the functions related to the upper image are associated with the mirror display mode image that has the same external appearance as said upper image. In this embodiment, the functions that are respectively associated with the defined portions in the mirror display mode image include various functions realized by the multimedia system 2. For example, the various functions that are respectively associated with the defined portions in the mirror display mode image may include: various functions that can be realized by the multimedia system switch of the mechanical switch group 6; and further various functions (the functions of the multimedia system) that cannot be realized by the multimedia system switch. FIG. 4B is a view of one example of the mirror display mode image. In the example shown in FIG. 4B, the mirror display mode image is the navigation image, and the operation item displays 501 to 507 for the various setting are provided.

Because of the same external appearance as the upper image that is output onto the upper display 3, the mirror display mode image can be generated by using the video signal that is output onto the upper display 3 by the multimedia system 2. In this way, drawing processing of the mirror display mode image in the display control section 110 becomes no longer necessary or simplified, which is advantageous in terms of the cost.

Based on mode switching input by the user, the display control section 110 is switched between the independent display mode and the mirror display mode. The mode switching input is input that satisfies the transition condition (will be described below with reference to FIG. 5) between the independent display mode and the mirror display mode and is prescribed in advance. The mode switching input may include an arbitrary one type or arbitrary two types of predetermined input in the mechanical switch group 6, predetermined input on the touch panel 5, predetermined input using voice (predetermined input recognized by a voice recognition engine), and predetermined input by a hand or finger gesture (predetermined input recognized by a gesture recognition engine).

In this embodiment, as one example, as will be described below, the mode switching input includes the predetermined input in the mechanical switch group 6, such as an operation of the top switch, and the predetermined input on the touch panel 5. The operation of the top switch is one type of the input that satisfies the transition condition from the mirror display mode to the independent display mode.

The predetermined input on the touch panel 5 (hereinafter referred to as "predetermined touch input") includes: first input that satisfies the transition condition from the independent display mode to the mirror display mode; and second input that satisfies the transition condition from the mirror display mode to the independent display mode. The first input is accompanied with finger movement in a first direction, and the second input is accompanied with the finger movement in a reverse direction from the first direction. Hereinafter, the up-down direction (an up direction and a down direction) related to the input on the touch panel 5 corresponds to a vertical direction of an operation screen of the touch panel 5. In addition, a left-right direction (a left direction and a right direction) related to the input on the touch panel 5 corresponds to a horizontal direction of the operation screen of the touch panel 5. For example, the first direction is any one of the up direction, the down direction, the left direction, and the right direction on the operation screen of the touch panel 5. The up direction and the down direction on the operation screen of the touch panel 5 may respectively correspond to the up direction and the down direction in the up-down direction of the vehicle. In addition, the left direction and the right direction on the operation screen of the touch panel 5 may respectively correspond to the left direction and the right direction in a vehicle width direction of the vehicle.

In this embodiment, as one example, the first direction is the down direction. Accordingly, the first input is accompanied with the finger movement in the down direction, and the second input is accompanied with the finger movement in the up direction. More specifically, the first input is drag, flick or edge-in in the down direction (see a condition (1), which will be described below), and the second input is the drag, the flick, or the edge-in in the up direction (see a condition (14), which will be described below). The edge-in is an operation that can be detected when both ends in the up-down direction of the operation screen on the touch panel 5 extend beyond both ends in the up-down direction of the screen of the lower display 4. The edge-in corresponds to an operation of finger swipe from an end region in the up-down direction of the operation screen on the touch panel 5 to a region in the operation screen on the touch panel 5 that overlaps the screen of the lower display 4. For example, the edge-in in the down direction corresponds to an operation of the finger swipe from an upper end region in the operation screen on the touch panel 5 to a region in the operation screen on the touch panel 5 that overlaps the screen of the lower display 4.

Furthermore, the display control section 110 switches the mode from the mirror display mode to the independent display mode (see a condition (11), which will be described below) on the basis of a non-operational state by the user (hereinafter referred to as a "particular non-operational state") on the mirror display mode image in the mirror display mode for a predetermined time T1 (for example, 20 seconds) or longer. The particular non-operational state is a state where any input with respect to the mirror display mode image that is output onto the lower display 4 (the input on the touch panel 5 or the input in the mechanical switch group 6) is not made. In this way, the transition from the mirror display mode to the independent display mode can be realized without a special switching operation by the user being necessary, and thus the convenience is improved. For example, a time when the user wishes to output a display in the mirror display mode onto the lower display 4 corresponds to a time when the user wishes to perform the operation related to the mirror display mode image (the upper image) on the lower display 4. Because the upper image that has the same external appearance as the mirror display mode image is shown on the upper display 3 in the mirror display mode, the output of the mirror display mode image onto the lower display 4 becomes unnecessary at a time point at which the operation related to the mirror display mode image on the lower display 4 becomes unnecessary. In such a case, the user can realize the transition from the mirror display mode to the independent display mode without performing the operation in the mirror display mode of the lower display 4 for the predetermined time T1, and thus the user feels the convenience.

FIG. 5 is a state transition view that illustrates one example of the transition condition between the independent display mode and the mirror display mode. The upper display 3, the lower display 4, and the mechanical switch group 6 are also shown in FIG. 5.

The transition condition from the independent display mode to the mirror display mode is satisfied when any of the following conditions (1) to (2) is satisfied. (1) The drag, the flick, or the edge-in in the down direction is detected on the touch panel 5. (2) The operation of a switch of the multimedia system (for example, the map switch or the destination switch) in the mechanical switch group 6 is detected.

The transition condition from the mirror display mode to the independent display mode (a recovery condition) is satisfied when any of the following conditions (11) to (14) is satisfied. (11) The non-operative state continues for the predetermined time T1. (12) The operation of the vehicle control system switch in the mechanical switch group 6 is detected. (13) The operation of the top switch in the mechanical switch group 6 is detected. (14) The drag, the flick, or the edge-in in the up direction is detected on the touch panel 5.

In this embodiment, as one example, as shown in FIG. 5, the display control section 110 is switched from the independent display mode to the mirror display mode on the basis of an event (the mode switching input) that satisfies any of the conditions (1) to (2) in the independent display mode. In addition, the display control section 110 is switched from the mirror display mode to the independent display mode on the basis of an event (the particular non-operational state) that satisfies the condition (11) in the mirror display mode. Furthermore, the display control section 110 is switched from the mirror display mode to the independent display mode on the basis of an event (the mode switching input) that satisfies any of the conditions (12) to (14) in the mirror display mode. Note that, in the following description, switching from the independent display mode to the mirror display mode and switching from the mirror display mode to the independent display mode will also collectively be referred to as "switching of the display mode".

Furthermore, the display control section 110 executes the animation processing that includes continuous output of the composite image (see FIG. 8B, FIG. 10B) in which one of the independent display mode image and the mirror display mode image is partially and continuously hidden by the other over plural frame cycles on the lower display 4. The animation processing is processing to generate motion by using plural static images (the composite image). The animation processing includes: automatic animation processing (one example of the first animation processing) that precedes switching of the display mode; and finger-linked animation processing (one example of the second animation processing) that is executed on the basis of the input at a stage at which the input is not confirmed as the above "predetermined touch input". The animation processing may further include cancellation-time animation processing, which will be described below.

The automatic animation processing is processing to change the composite image (see FIG. 8B and FIG. 10B) over the plural frame cycles and then output the lower GUI image after switching in an aspect in which the lower GUI image after switching gradually appears while a display range of the lower GUI image as one of the independent display mode image and the mirror display mode image before switching is gradually reduced along with a lapse of time. The aspect in which the lower GUI image after switching gradually appears while the display range of the lower GUI image before switching is gradually reduced is realized by an aspect in which a boundary (see an upper edge 921 in FIG. 8B and a lower edge 931 in FIG. 10B) between the lower GUI image before switching and the lower GUI image after switching in the composite image gradually moves. By executing such automatic animation processing, the user can visually understand occurrence of switching of the display mode.

The finger-linked animation processing is processing to change the composite image (see FIG. 8B and FIG. 10B) over the plural frame cycles in an interlocking manner with the finger movement in the down direction or the up direction on the touch panel 5 in an aspect in which a boundary (see the upper edge 921 in FIG. 8B and the lower edge 931 in FIG. 10B) between a portion as the independent display mode image and a portion as the mirror display mode image in the composite image moves in the down direction or the up direction. By executing such finger-linked animation processing, the user can visually understand the occurrence of switching of the display mode when continuing the finger movement in the down direction or the up direction on the touch panel 5 as is.

Here, the finger-linked animation processing and the automatic animation processing have in common that the boundary (see the upper edge 921 in FIG. 8B and the lower edge 931 in FIG. 10B) in the composite image moves over the plural frame cycles. Accordingly, in the following description, common portions thereof will be described without distinguishing the finger-linked animation processing and the automatic animation processing from each other. A further detailed description on the animation processing will be made below.

Furthermore, based on a display change command from the input reception processing section 114 in the independent display mode, the display control section 110 executes processing to respond to said display change command. The processing to respond to the display change command is processing to make a change of the screen transition, the screen scrolling, a setting display, or the like that is related to the independent display mode image. The display change command to the display control section 110 is generated on the basis of the operation signal of the vehicle control system switch in the mechanical switch group 6 or the operation input that is associated with the defined portion of the independent display mode image.

Based on the operation input on the touch panel 5, the input reception processing section 114 executes particular function processing that executes a predetermined function associated with the independent display mode image or the mirror display mode image output onto the lower display 4. In this embodiment, the predetermined function includes: a function that is associated with the specified defined portion of the independent display mode image (one example of the first predetermined function); and a function that is associated with the specified defined portion of the mirror display mode image (one example of the second predetermined function). In this embodiment, as one example, the specified defined portion includes all of the defined portions of the independent display mode image and the mirror display mode image. Accordingly, in the following description, such terms as the "specified defined portion" and the "predetermined function" will only be used when necessary, and such terms as the "defined portion" and the "function" will simply be used.

More specifically, in a state where the independent display mode image is output onto the lower display 4, the input reception processing section 114 executes the function that is associated with the defined portion of said independent display mode image on the basis of the operation input associated with said defined portion. For example, the input reception processing section 114 sends a control command that is associated with said function to the CAN 30, and provides the display control section 110 with the display change command associated with said function. The control command that is sent to the CAN 30 instructs to change a setting value of the air conditioner (for example, a blower air amount, a set temperature, or the like), for example. The display change command that is provided to the display control section 110 instructs to change the screen transition, the screen scrolling, the setting display, or the like that is related to the independent display mode image, or the like. Accordingly, in the independent display mode, the independent display mode image can function as a GUI of the vehicle control system, and the touch panel 5 can function as an operating device of the vehicle control system.

In addition, in a state where the mirror display mode image is output onto the lower display 4, the input reception processing section 114 executes the function that is associated with the defined portion in said mirror display mode image on the basis of the operation input that is associated with said defined portion. That is, the input reception processing section 114 provides the multimedia system 2 with the operation signal that is associated with said function. Accordingly, in the mirror display mode, with the upper image, the mirror display mode image can function as the GUI related to the multimedia system 2, and the touch panel 5 can function as the operating device that has the multimedia system 2 as an operation target.

For example, the input reception processing section 114 executes the particular function processing on the basis of the GUI information that is prepared for each of the independent display mode images and each of the mirror display mode images. For example, as shown in FIG. 6, the GUI information includes: an image ID that is used to identify each of the independent display mode images and each of the mirror display mode images; and a defined portion ID that is used to identify each of one or more of the defined portions per image ID. The GUI information further includes per defined portion ID: a position (a range) of the defined portion; the operation input (a type of the operation input) that is associated with the defined portion; the operation signal that is associated with the defined portion (that is, the operation signal for realizing the function associated with the defined portion); and an output destination of the operation signal. Note that, in the GUI information, the output destination of the operation signal related to the independent display mode image is not defined to the multimedia system 2 and the output destination of the operation signal related to the mirror display mode image is not defined to the display control section 110. Note that such GUI information is stored in the main memory 13 in advance, for example.

For example, in FIG. 6, an image ID=00001 relates to the mirror display mode image. The defined portion (xx10 to xx11, yy10 to yy11) with a defined portion ID 00001 related to the image ID=00001 represents a rectangular region where an x-coordinate of the image is xx10 to xx11 and a y-coordinate is yy10 to yy11. In the defined portion ID 00001, a tap is received in said defined portion, and a display change command A is output onto the multimedia system 2 in response to said tap. Similarly, in the defined portion (xx30 to xx31, yy30 to yy31) with a defined portion ID 00003, a flick is received in said defined portion, and a downward scrolling command is output onto the multimedia system 2 in response to said flick. An image ID=00002 relates to the independent display mode image. In a defined portion (xx20 to xx21, yy20 to yy21) with a defined portion ID=00002 related to the image ID=00002, the tap is received in said defined portion, a set value increase command B is output onto the CAN 30 in response to said tap, and a display change command B is output onto the display control section 110.

Furthermore, the input reception processing section 114 executes processing that corresponds to the operation signal received from the mechanical switch group 6. More specifically, when receiving the operation signal related to the multimedia system switch, the input reception processing section 114 provides said operation signal to the multimedia system 2. In addition, when receiving the operation signal related to the vehicle control system switch, the input reception processing section 114 sends the control command that corresponds to said operation signal to the CAN 30, and provides the display change command that corresponds to said operation signal to the display control section 110. The display change command provided to the display control section 110 commands changes of the screen transition, the screen scrolling, the setting display, and the like that are related to the independent display mode image. In addition, when receiving the operation signal related to the top switch, the input reception processing section 114 generates the display change command that commands the screen transition to the home image of the independent display mode image. Once generating the display change command related to the top switch, the input reception processing section 114 provides said display change command to the display control section 110.

According to the operating apparatus for the vehicle in this embodiment that has been described so far, superior effects as will be described below are especially exerted.

First, as described above, the lower GUI image that is output onto the lower display 4 selectively includes: the independent display mode image that is independent of the upper image output onto the upper display 3; and the mirror display mode image that has the same external appearance as the upper image output onto the upper display 3. Based on the mode switching input from the user, the display control section 110 is switched between the independent display mode and the mirror display mode. Accordingly, the user can switch the lower GUI image that is output onto the lower display 4 from the independent display mode image to the mirror display mode image by the mode switching input, and thus the convenience is improved.

Because the mode switching input includes the predetermined touch input, the user can make the mode switching input without directly looking at the lower display 4 (or can make the mode switching input after pinpointing the position of the touch panel 5 of the lower display 4 by momentarily directly looking at the touch panel 5 before making the mode switching input), and thus movement of the driver's line of sight from the front at a time of making the mode switching input can be suppressed.

The transition between the independent display mode and the mirror display mode is accompanied with the change of the lower GUI image on the lower display 4 (the change between the independent display mode image and the mirror display mode image). Accordingly, the user can visually understand switching between the independent display mode and the mirror display mode by looking at the change between the independent display mode image and the mirror display mode image on the lower display 4 and thus intuitively becomes familiar with the apparatus.

In the independent display mode, the user can realize the function that is associated with the independent display mode image through the operation on the lower display 4. Accordingly, the user can realize the function that cannot be realized in the mirror display mode (the operation of the vehicle control system) through the operation of the lower display 4. In this way, in the independent display mode, while the upper image is in a visually recognizable state on the upper display 3 with the relatively high visibility, the user can perform the operation related to the independent display mode image, which is independent of the upper image, on the lower display 4. Accordingly, in the independent display mode, regardless of a type of the operation performed on the lower display 4 during traveling, the user can maintain the navigation image in a visually recognizable state on the upper display 3 with the superior visibility to the lower display 4.

In the mirror display mode, the mirror display mode image that has the same external appearance as the upper image output onto the upper display 3 is output onto the lower display 4. Accordingly, the user can perform the operation of the multimedia system 2 (for example, the navigation operation) on the lower display 4. In this way, in the mirror display mode, the user can perform the operation related to the mirror display mode image that has the same external appearance as the upper image output onto the upper display 3 (=the operation related to said upper image) on the lower display 4 while looking at said mirror display mode image on the lower display 4. In this way, in the mirror display mode, the user can also perform the operation related to the upper image on the lower display 4 while looking at said upper image on the upper display 3 with the relatively high visibility. For example, when performing a motion-related operation such as scrolling of a map by the drag, reduction/enlargement of the map by pinching-in/out, or the like, the user can operate the touch panel 5 of the lower display 4 like a remote touch pad while looking at the upper image. Thus, easy visibility during driving and the operability of the navigation image are particularly improved. In addition, the driver can comprehend a position of the desired operation item display in advance by looking at the upper image for the operation other than the motion-related operation. Thus, when the user realizes the function related to said operation item display on the lower display 4, a time to withdraw the line of sight to the front can be shortened. Furthermore, the lower display 4 is provided at the position that is lower than the upper display 3 and that is near the driver's seat. Thus, compared to a case where a touch panel is provided in the upper display 3 and the operation related to the upper image is performed on the upper display 3, the operability is improved.

The upper image output onto the upper display 3 is the navigation image or the like. Accordingly, GUI software used for an "existing single display with a touch panel" can be used, for example. In addition, because the mirror display mode image has the same external appearance as the upper image, as shown in FIG. 1, the mirror display mode image can be generated by using the video signal that is received by the upper display 3. In this way, development man-hour of software for generation of the mirror display mode image in the display control section 110 and software for the multimedia system 2 can be reduced.

In each of the independent display mode and the mirror display mode, the user can realize the various functions through the operation of the touch panel 5 on the lower display 4. Accordingly, the upper display 3 can be used exclusively for a display purpose, and in such a case, cost of the upper display 3 (cost related to the touch panel) can be reduced. When the upper display 3 is used exclusively for the display purpose, the upper display 3 can be arranged at a far position where the driver cannot reach. In this way, a difference between a direction of the driver's line of sight to the upper display 3 and a direction of the driver's line of sight to the front during traveling (displacement of the driver's line of sight from the front at a time when the user visually recognizes the upper image on the upper display 3) can be minimized.

Next, a description will be made on a preferred example of the animation processing with reference to FIG. 7 to FIG. 10C. While the upper display 3, the lower display 4, and the mechanical switch group 6 are shown together in each of FIG. 7 to FIG. 10C, a description will mainly be made on the lower image on the lower display 4 with reference to FIG. 7 to FIG. 10C. In addition, a description will mainly be made with assumption of executing the finger-linked animation processing with reference to FIG. 7 to FIG. 10C; however, the description will substantially be the same when the automatic animation processing is assumed.

<Louver-Door Model>

Figure 7:
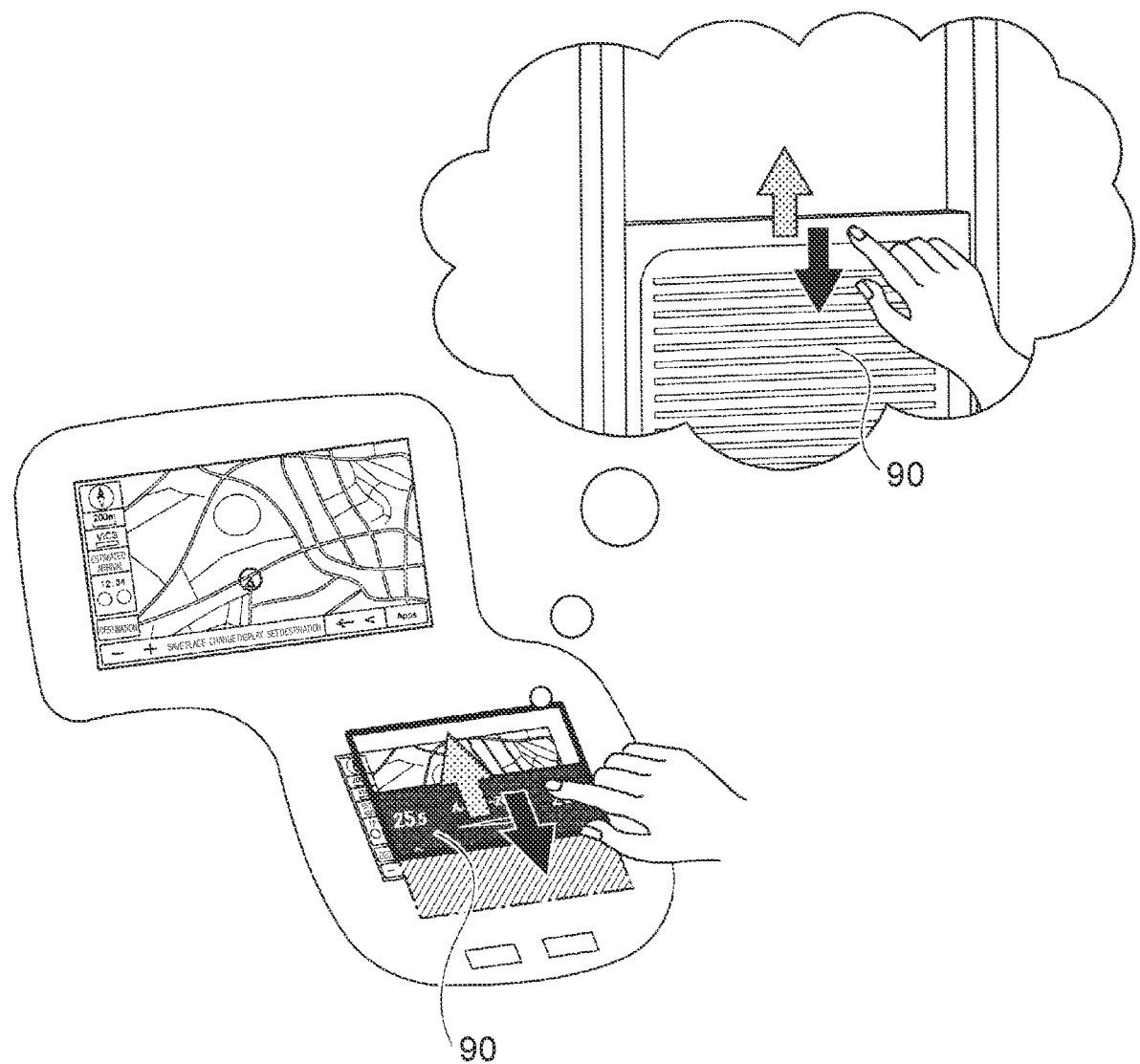
FIG. 7 is a conceptual explanatory view of a louver-door model.

The preferred example of the animation processing is based on a louver-door model (one example of the door model). FIG. 7 is a conceptual explanatory view of the louver-door model.

As conceptually shown in FIG. 7, the louver-door model is a model in which the independent display mode image serves as a louver door 90 (one example of the door) that selectively covers the mirror display mode image and causes translational movement within the screen or out of the screen. In other words, as conceptually shown in a balloon in FIG. 7, the independent display mode image is used to resemble the louver door 90 (the louver door 90 on which the independent display mode image is drawn in an interior side), and the louver door 90 is drawn upward or downward. Accordingly, the louver-door model is a model that realizes the animation processing in an aspect that the mirror display mode image is hidden when the independent display mode image is drawn upward and the mirror display mode image is visible when the independent display mode image is drawn downward.

Figure 8A:
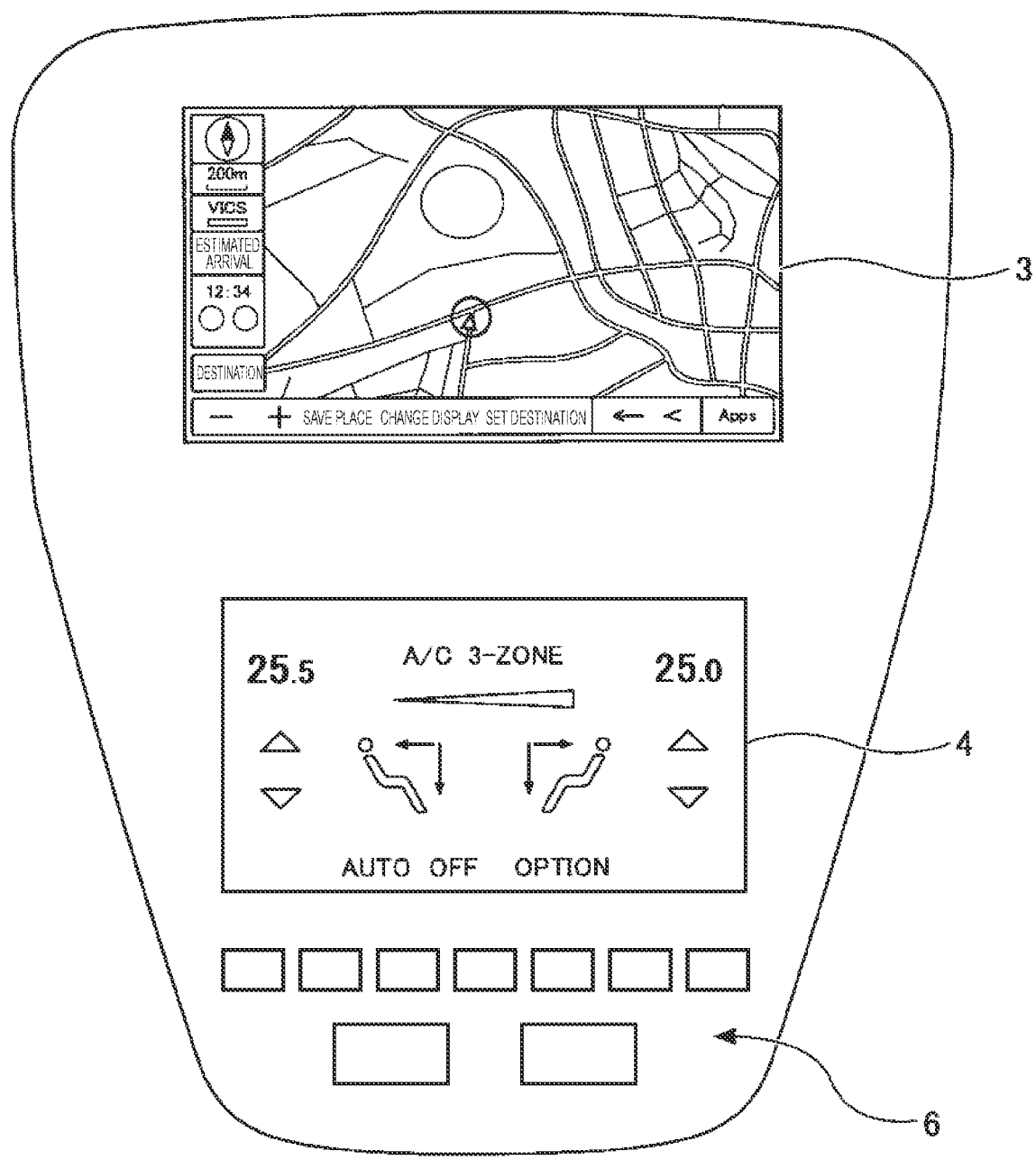
FIG. 8A is an explanatory view of animation processing based on the louver-door model.
Figure 8B:
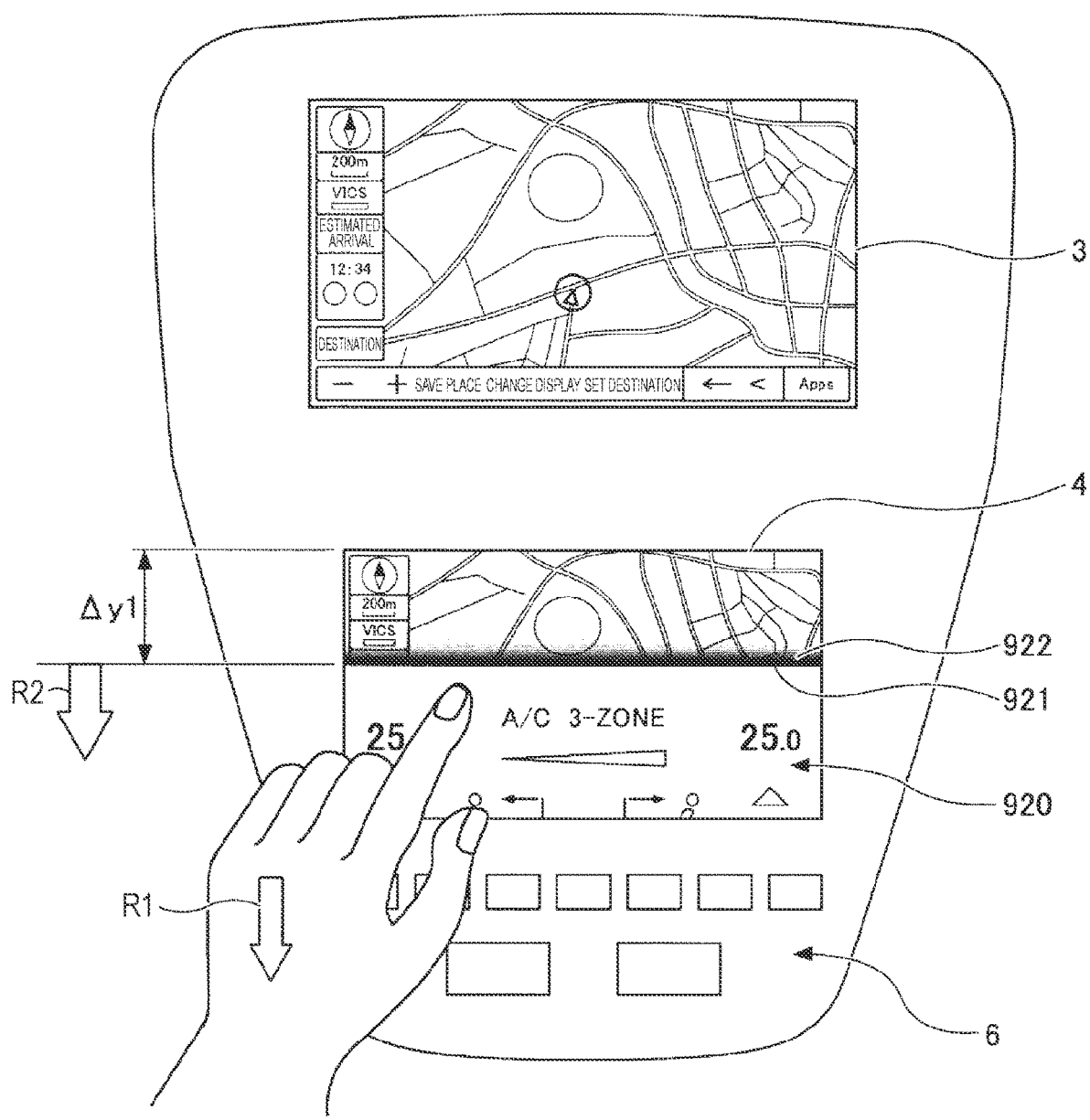
FIG. 8B is an explanatory view of the animation processing based on the louver-door model.
Figure 8C:
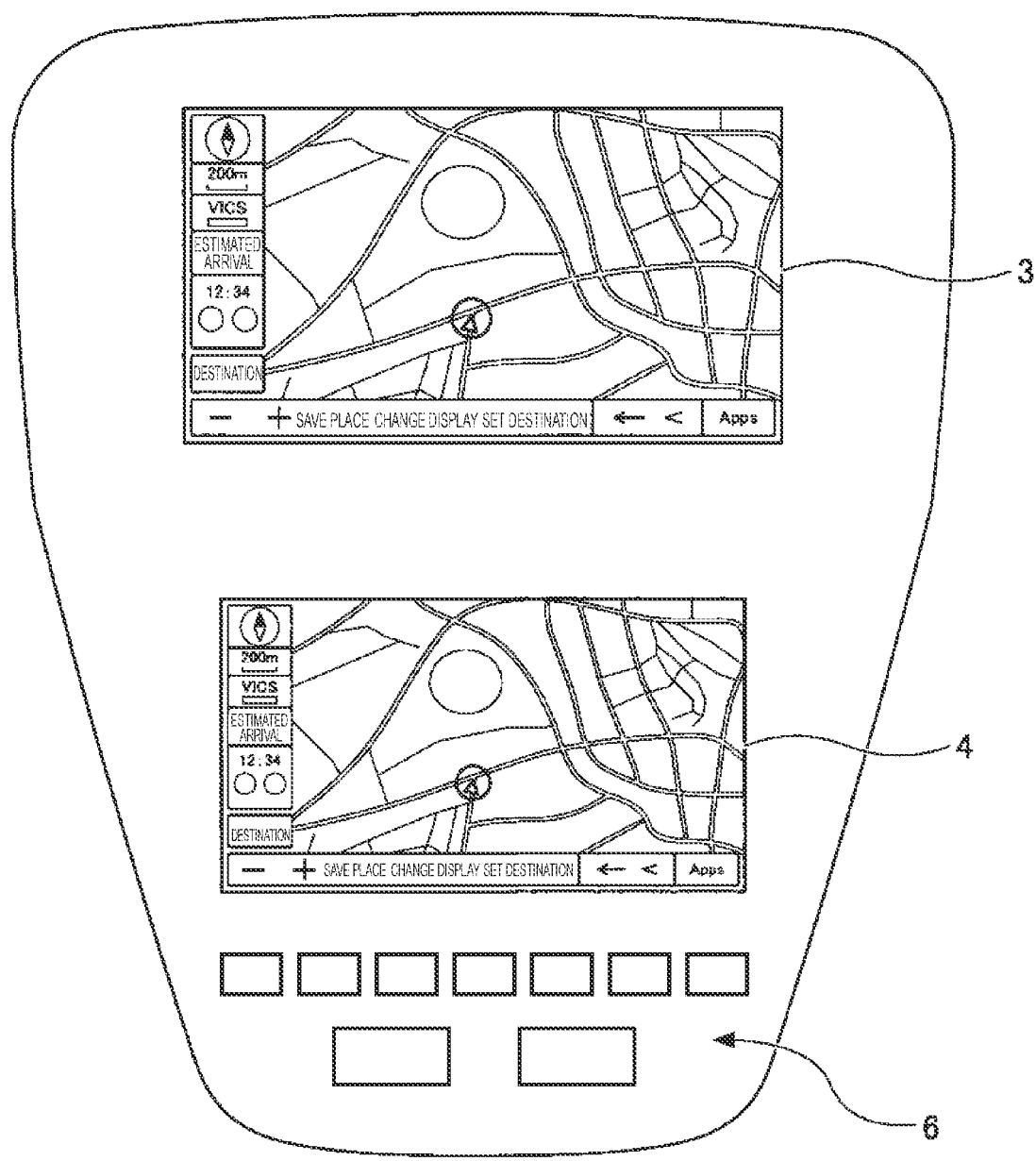
FIG. 8C is an explanatory view of the animation processing based on the louver-door model.

FIG. 8A to FIG. 8C are explanatory views of the animation processing based on the louver-door model. FIG. 8A shows a state before switching from the independent display mode to the mirror display mode. FIG. 8B shows a state during the animation processing that is related to switching from the independent display mode to the mirror display mode (one example of the composite image). FIG. 8C shows a state after switching from the independent display mode to the mirror display mode.

FIG. 8B schematically shows a state of a hand that makes the first input (the downward drag) (see an arrow R1). 920 denotes a louver door on which the independent display mode image is drawn on the interior side (hereinafter also referred to as a louver-door image 920), and 921 denotes an upper edge of the louver-door image 920 (a boundary on an upper side). In this embodiment, as shown in FIG. 8B, the composite image has the louver-door image 920 (a part of the independent display mode) on a lower side of the boundary (see the upper edge 921), and also has a part of the mirror display mode image on an upper side of the boundary (see the upper edge 921). This relates to the direction of each of the first input and the second input in the predetermined touch input.

FIG. 8B shows a state where displacement of the finger related to the first input is Δy1. When the louver door is drawn downward, an upper end of the louver door does not always have to be drawn downward by dragging with the finger, but any position in the louver door is dragged with the finger. Accordingly, a starting point of the first input does not have to be the upper end of the screen but may be a point below the upper end of the screen as shown in FIG. 8B, for example (in the example shown in FIG. 8B, a point above the position of the finger shown in FIG. 8B by Δy1 is the starting point of the first input).

In the louver-door model, as shown in FIG. 8A to FIG. 8C, the mirror display mode image (=the upper image, the navigation image in this example) that is hidden under the louver-door image 920 gradually appears (from the upper side) at a position between the upper edge 921 of the louver-door image 920 and an upper edge of the screen in conjunction with the downward movement of the louver-door image 920 (see an arrow R2). When the upper edge 921 of the louver-door image 920 conceptually reaches the lowermost portion of the screen (that is, when the louver door is drawn out of the screen and is accommodated downward), as shown in FIG. 8C, the mirror display mode image that is hidden under the louver-door image 920 is brought into a completely visible state (a state of being output onto the entire screen).

Because the louver-door model is based on the model using the louver door that is familiar to the user through his/her life, a layer relationship between the independent display mode image and the mirror display mode image becomes easily understandable, and thus intuitive understanding of the relationship between the independent display mode image and the mirror display mode image by the user can be promoted. That is, it can easily be understood that the independent display mode image (the louver-door image 920) is located on an upper layer (the interior side) from the mirror display mode image.

In addition, according to the louver-door model, the position of the mirror display mode image such as the navigation image, which is dynamically changed with the lapse of time or a change in the position of the vehicle, on the screen is constantly fixed during the animation processing. Thus, the drawing processing can relatively easily be executed.

Furthermore, in the example shown in FIG. 8B, because a shadow display 922 that represents a shadow effect formed by the upper end of the louver-door image 920 is drawn, it is further easily understood that the independent display mode image (the louver-door image 920) is located on the upper layer (the interior side) from the mirror display mode image. Note that, in order to achieve a similar effect, the mirror display mode image may be drawn in slightly smaller size than full size of the screen when being partially hidden by the louver-door image 920 and may be drawn to be enlarged to the full size of the screen when the louver-door image 920 conceptually moves out of the screen. In this case, due to a perspective effect, the layer relationship between the independent display mode image and the mirror display mode image is further easily understood.

Herein, the description has been made on the animation processing that is related to switching from the independent display mode to the mirror display mode. Meanwhile, reversal thereof is substantially the same. More specifically, the animation processing that is related to switching from the mirror display mode to the independent display mode is substantially the same except for a point that motion of the louver-door image 920 is reversed. That is, the animation processing based on the louver-door model is realized in an aspect in which the louver door is lifted in the up direction to hide the mirror display mode image under the louver-door image 920. At this time, similarly, the mirror display mode image may be drawn in an aspect that the mirror display mode image becomes slightly smaller than the full size of the screen along with lifting of the louver-door image 920 (that is, an image of withdrawal). In this way, understanding of the layer relationship between the independent display mode image and the mirror display mode image is further facilitated by the perspective effect.

Note that, as a modified example of the louver-door model, a door without a clearance, such as a sliding door or a shutter, may be used instead of the louver door. In addition, in the above-described louver-door model, the louver door is accommodated on a lower side on the outside of the screen. However, the louver-door model in which the louver door is accommodated on an upper side on the outside of the screen may be used. In this case, the image of the shutter may be used instead of the louver door (that is, a shutter model may be used). Note that, when the louver-door model, in which the louver door is accommodated on the upper side on the outside of the screen, or the similar shutter model is adopted, the direction of each of the first input and the second input (the up-down direction) in the predetermined touch input is vertically reversed.

<Roll-Up-Curtain Model>

Figure 9:
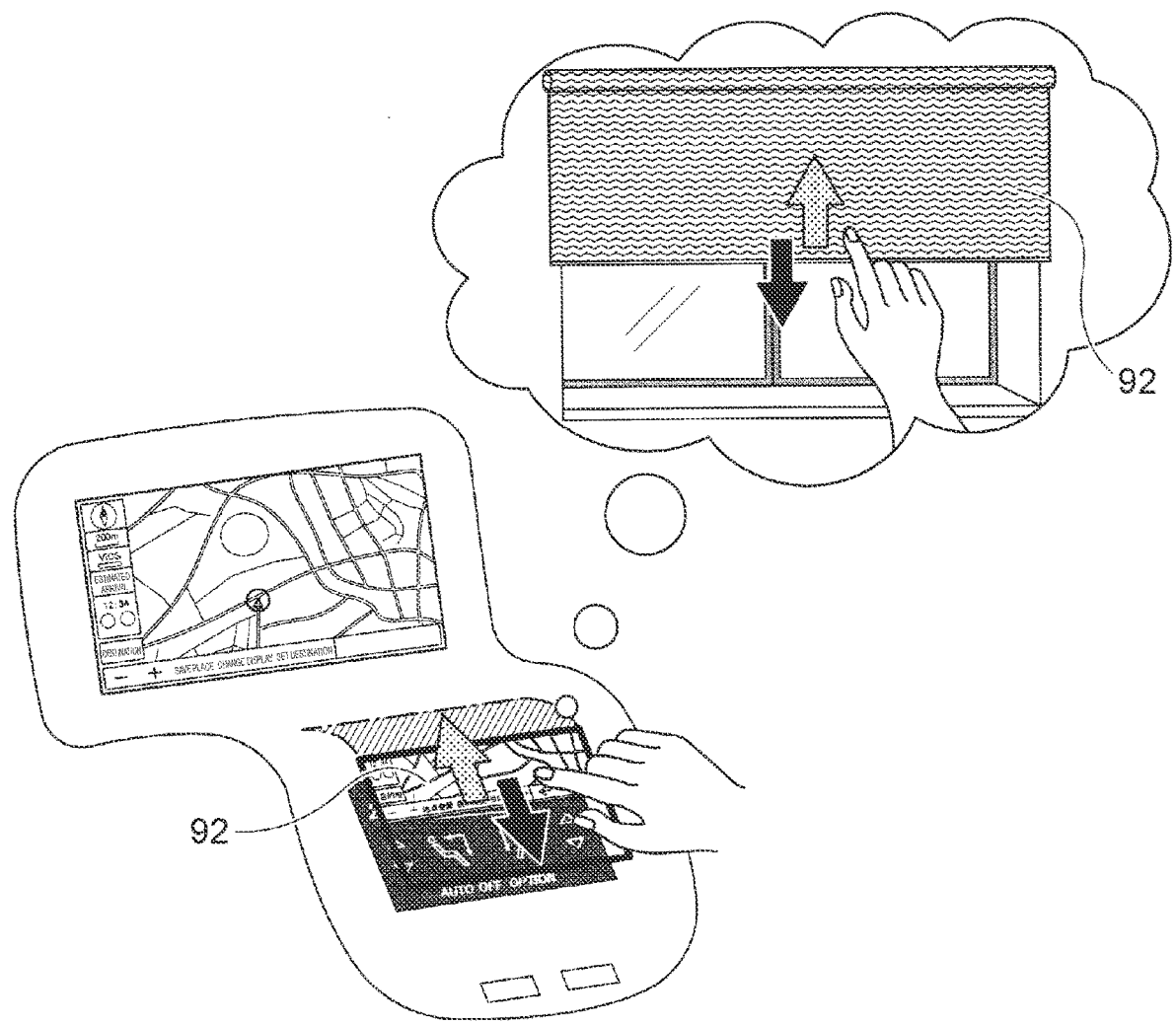
FIG. 9 is a conceptual explanatory view of a roll-up-curtain model.

The other preferred example of the animation processing is based on a roll-up-curtain model. FIG. 9 is a schematic explanatory view of a roll-up-curtain model.

As conceptually shown in FIG. 9, the roll-up-curtain model is a model in which the mirror display mode image serves as a roll curtain 92 that selectively covers the independent display mode image and is laid out in the screen or is rolled up to the outside of the screen. In other words, as conceptually shown in a balloon in FIG. 9, the mirror display mode image is used to resemble the roll curtain 92 (the roll curtain 92 on which the mirror display mode image is drawn in the interior side), and the roll curtain 92 is laid out or rolled up. Accordingly, the roll-up-curtain model is a model that realizes the animation processing in an aspect that the mirror display mode image is visible when the mirror display mode image is laid out and the independent display mode image is visible when the mirror display mode image is rolled up.

Figure 10A:
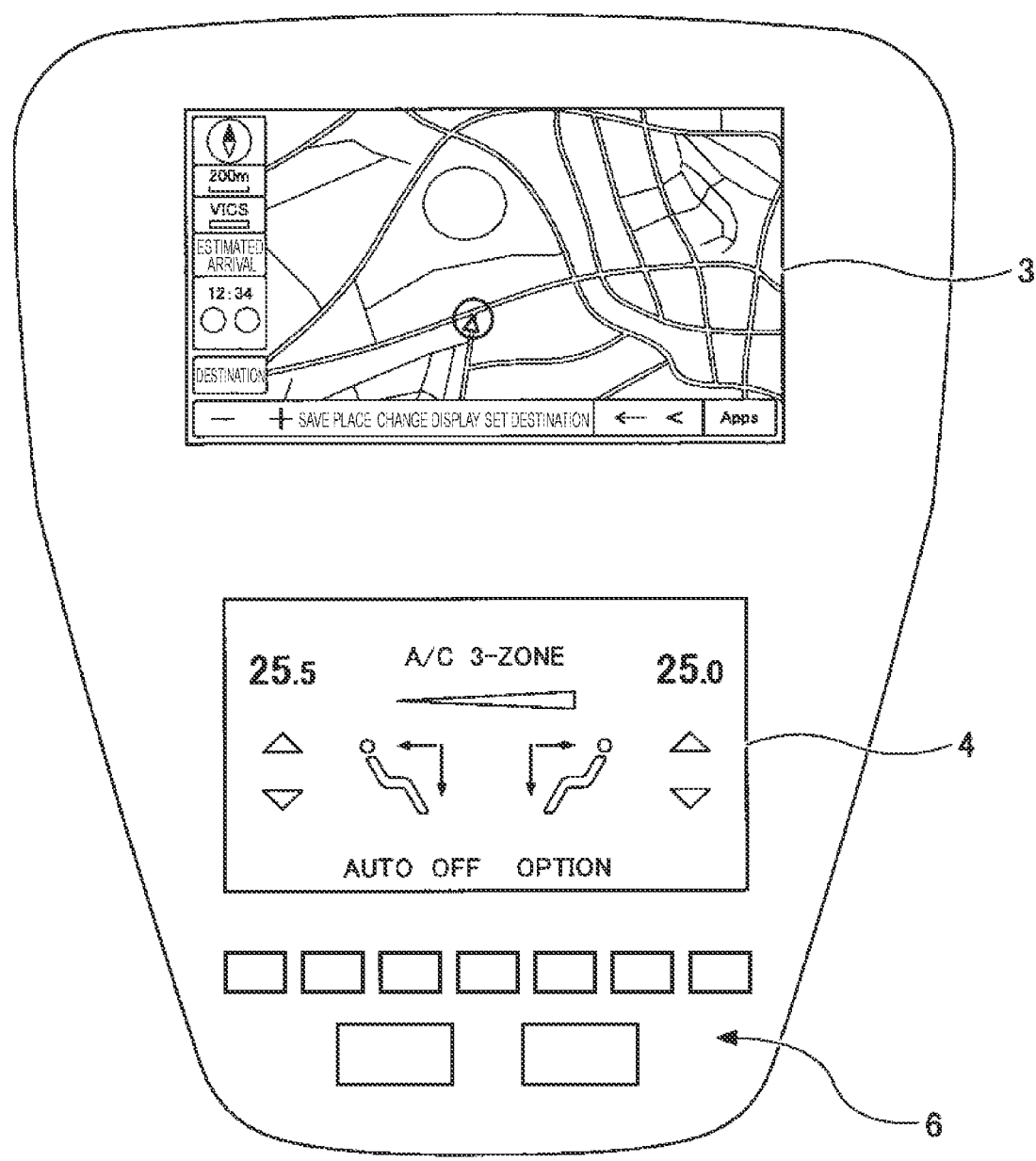
FIG. 10A is an explanatory view of the animation processing based on the roll-up-curtain model.
Figure 10B:
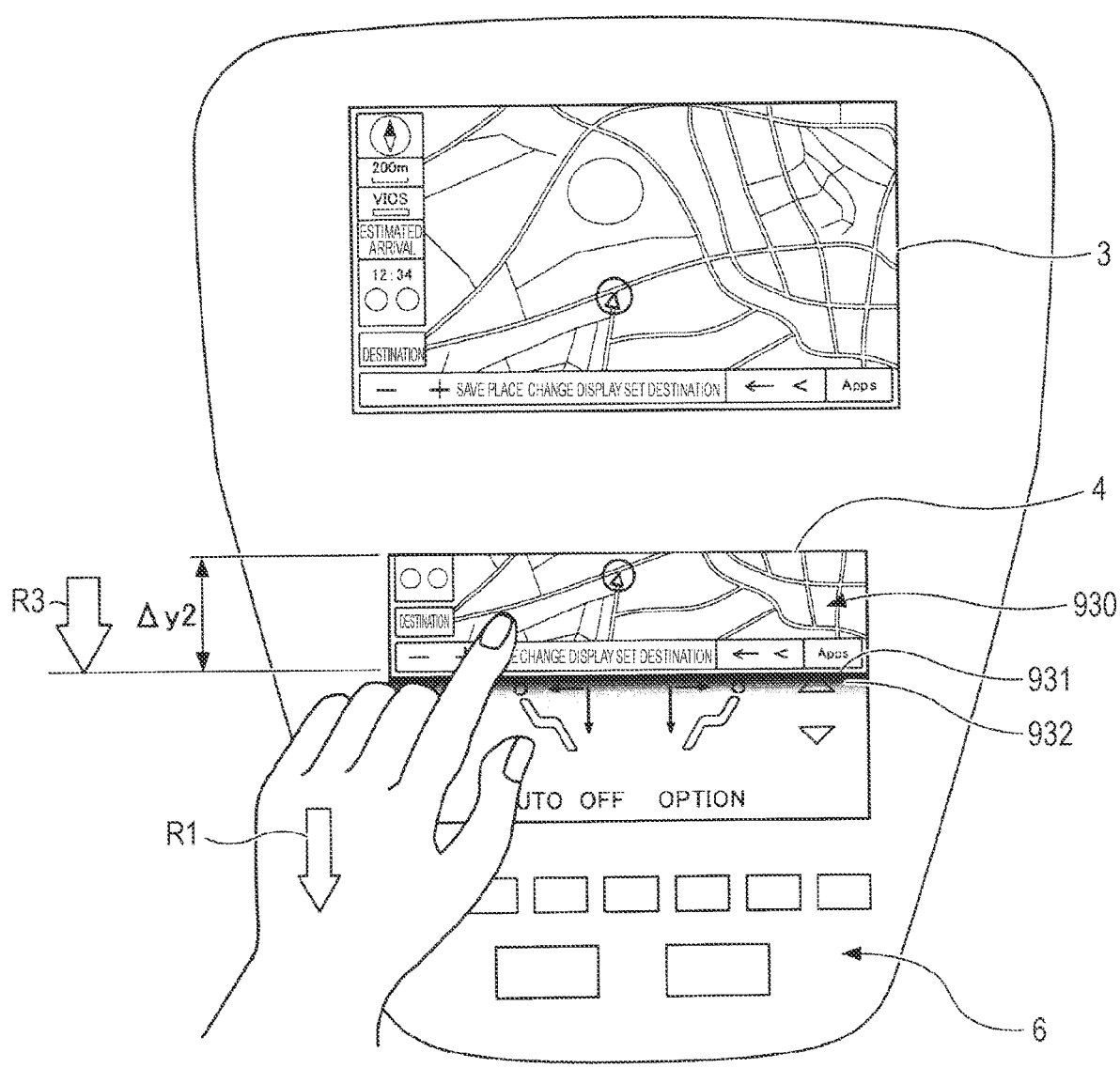
FIG. 10B is an explanatory view of the animation processing based on the roll-up-curtain model.
Figure 10C:
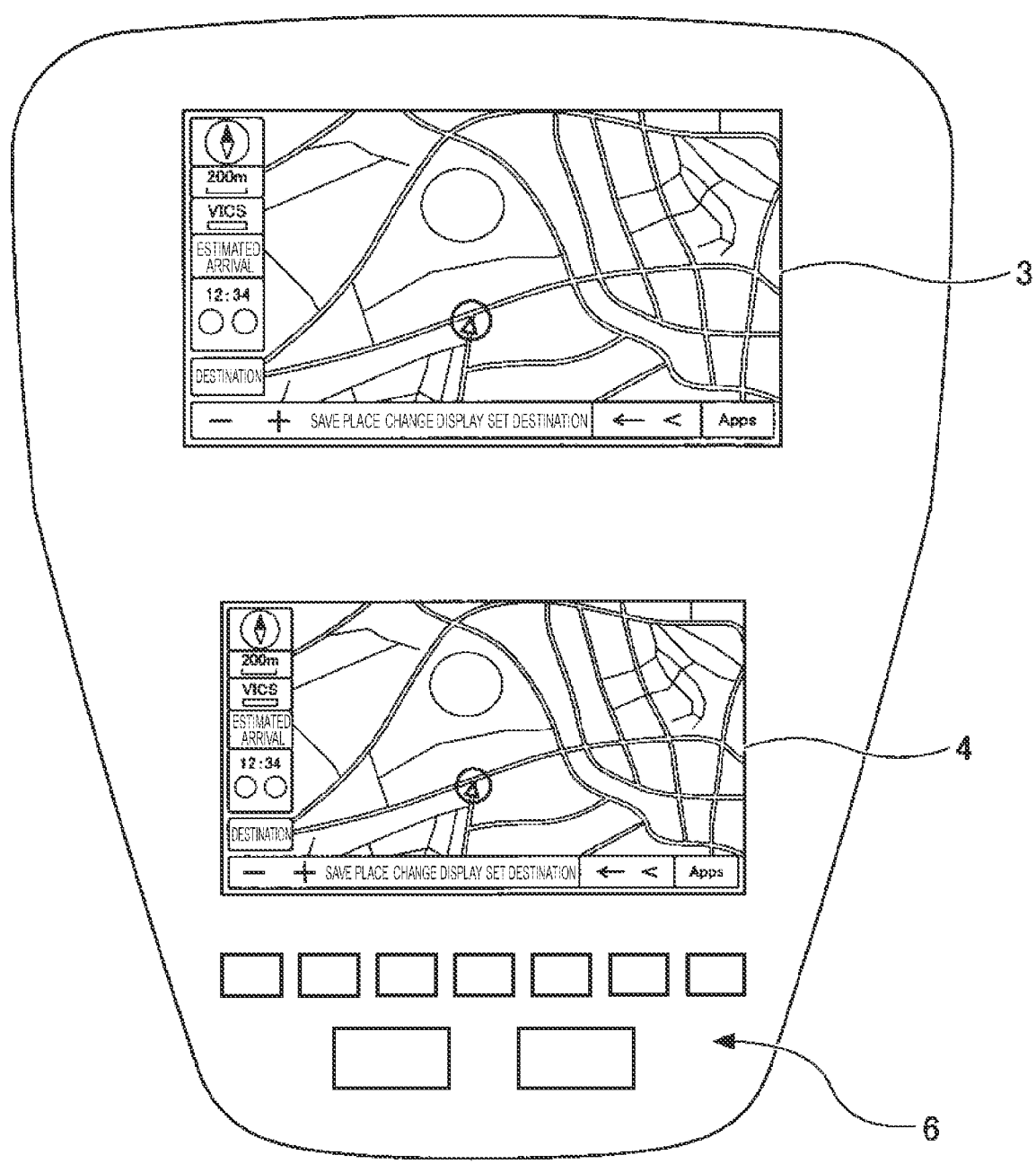
FIG. 10C is an explanatory view of the animation processing based on the roll-up-curtain model.

FIG. 10A to FIG. 10C are explanatory views of the animation processing based on the roll-up-curtain model. FIG. 10A shows a state before switching from the independent display mode to the mirror display mode. FIG. 10B shows a state during the animation processing that is related to switching from the independent display mode image to the mirror display mode image (one example of the composite image), and FIG. 10C shows a state after switching from the independent display mode to the mirror display mode.

FIG. 10B schematically shows a state of the hand that makes the first input (the downward drag) (see the arrow R1). 930 denotes a roll curtain on which the mirror display mode image is drawn on the interior side (hereinafter also referred to as a roll-curtain image 930), and 931 denotes a lower edge of the roll-curtain image 930 (a lower boundary). In this embodiment, as shown in FIG. 10B, the composite image has a part of the independent display mode on a lower side of a boundary (see the lower edge 931) and has the roll-curtain image 930 (a part of the mirror display mode image) on an upper side of the boundary (see the lower edge 931). This relates to the direction of each of the first input and the second input in the predetermined touch input.

FIG. 10B shows a state where the displacement of the finger related to the first input is Δy2. The roll curtain is laid out in the screen when a lower edge thereof (an image of a string hung from the lower edge, for example) is dragged downward by the finger or the like. Accordingly, the starting point of the first input is the upper end of the screen. FIG.

10B shows a state where the roll curtain is laid out to a lower side of the upper end of the screen (see an arrow R3).

As shown in FIG. 10A to FIG. 10C, in the roll-up-curtain model, in conjunction with downward layout of the roll-curtain image 930 (=the upper image, the navigation image in this example), the roll-curtain image 930 gradually appears downward from the upper side of the screen in a manner to appear from a lower edge side of the image (the lower edge side of the navigation image), and the independent display mode image is gradually hidden (from the upper side). When the lower edge 931 of the roll-curtain image 930 conceptually reaches the lowermost portion of the screen (or moves downward to the outside of the screen), as shown in FIG. 10C, the independent display mode image is completely hidden under the roll-curtain image 930 (that is, the roll-curtain image 930 is output onto the entire screen).

The roll-up-curtain model is based on the model using the roll curtain that is familiar to the user from his/her life. Accordingly, the layer relationship between the independent display mode image and the mirror display mode image is easily understood, and intuitive understanding of the relationship between the independent display mode image and the mirror display mode image by the user can be promoted. That is, it is easily understood that the mirror display mode image (the roll-curtain image 930) is located on the upper layer (the interior side) from the independent display mode image.

In addition, in the example shown in FIG. 10B, because a shadow display 932 that represents a shadow effect formed by the lower edge of the roll-curtain image 930 is drawn, it is further easily understood that the mirror display mode image (the roll-curtain image 930) is located on the upper layer (the interior side) from the independent display mode image. Note that, in order to obtain a similar effect, once the mirror display mode image (the roll-curtain image 930) starts being laid out, the independent display mode image may be drawn in an aspect of being slightly smaller than the full size of the screen (that is, the image of withdrawal). In this way, the layer relationship between the independent display mode image and the mirror display mode image is further easily understood due to the perspective effect.

Here, the description has been made on the animation processing that is related to switching from the independent display mode to the mirror display mode. Meanwhile, the reversal thereof is substantially the same. More specifically, the animation processing that is related to switching from the mirror display mode to the independent display mode is substantially the same except for a point that motion of the roll-curtain image 930 is reversed. That is, the animation processing based on the roll-up-curtain model is realized in an aspect that the roll curtain is rolled in the up direction and the independent display mode image appears from the position under the roll-curtain image 930. At this time, similarly, during lifting of the roll-curtain image 930, the independent display mode image may be drawn to be slightly smaller than the full size of the screen and to be enlarged to the full size of the screen at a time point at which lifting of the roll-curtain image 930 is completed. In this way, due to the perspective effect, the layer relationship between the independent display mode image and the mirror display mode image is further easily understood.

Note that, in the roll-up-curtain model shown in FIG. 9 to FIG. 10C, the layer relationship in which the mirror display mode image (the roll-curtain image 930) is in the upper layer (on the interior side) from the independent display mode image is established. However, the disclosure is not limited thereto. For example, in the modified example, the roll-up-curtain model may be realized by the layer relationship in which the independent display mode image is in the upper layer (on the interior side) from the mirror display mode image. In this case, the roll curtain (the roll-curtain image) on which the independent display mode image is drawn on the interior side is used. Then, in conjunction with rolling up of the roll curtain, the mirror display mode image that is hidden underneath gradually appears from a portion between the lower edge 931 of the roll-curtain image and the lower edge of the screen (from the lower side). Once the roll-curtain image is conceptually rolled up completely, as shown in FIG. 10C, the mirror display mode image that has been hidden under the roll-curtain image is brought into a completely visible state. Note that, in such a modified example, the direction (the up-down direction) of each of the first input and the second input in the predetermined touch input is vertically reversed.

In the roll-up-curtain model shown in FIG. 9 to FIG. 10C, the roll curtain is of a roll-up type on the upper side (that is, a type in which the upper end side of the roll-curtain image 930 is rolled up). However, the disclosure is not limited thereto. For example, the roll-up-curtain model that is based on the roll curtain of the roll-up type on the lower side (that is, a type in which the lower end side of the roll-curtain image 930 is rolled up and stored upward) may be used. In this case, a blind image may be used instead of the roll-curtain image.

Next, a description will be made on an operation example of the control unit 10 with reference to FIG. 11 to FIG. 17. Here, the description will be made on the operation example that is accompanied with the animation processing based on the above-described louver-door model (FIG. 7 to FIG. 8C) as one example. However, the animation processing based on the roll-up-curtain model can be applied in a substantially similar manner. In the following operation example, advantageous differences from the animation processing based on the roll-up-curtain model, which is shown in FIG. 9 to FIG. 10C, and the like will appropriately be described.

Figure 11:
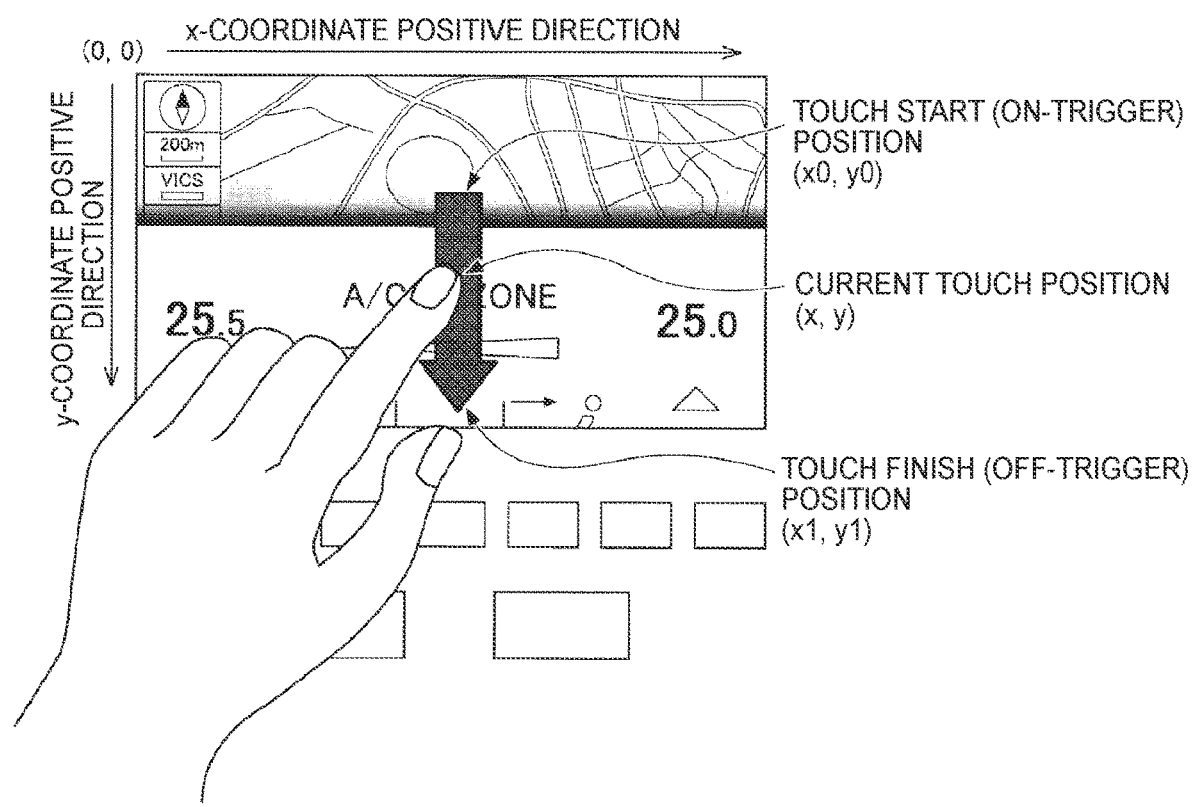
FIG. 11 is an explanatory view of various definitions used for explanation of an operation example.

FIG. 11 is an explanatory view of various definitions used for the description of the operation example. Each of FIG. 12 to FIG. 15 is a schematic flowchart of one example of processing that is executed by the input reception processing section 114 of the control unit 10.

Here, as shown in FIG. 11, x, y-coordinates and positive directions on the screen of the lower display 4 will be defined. FIG. 11 schematically shows the user's hand that makes the downward drag (see an arrow). In the following description, as shown in FIG. 11, a current touch position is set as (x, y), a touch start (on-trigger) position is set as (x0, y0), and a touch finish (off-trigger) position is set as (x1, y1).

Figure 12:
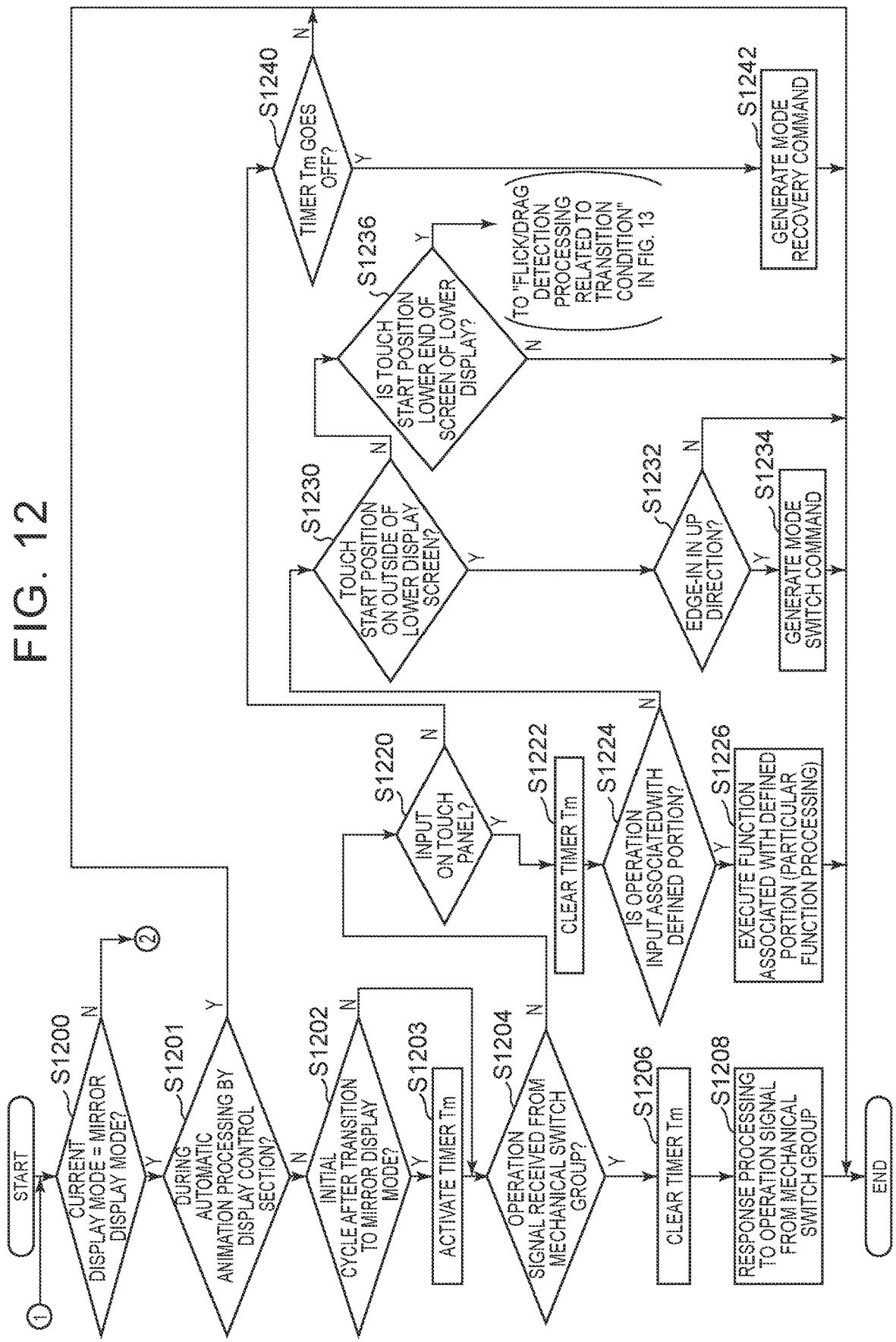
FIG. 12 is a schematic flowchart of one example of processing that is executed by an input reception processing section 114 of the control unit 10.
Figure 13:
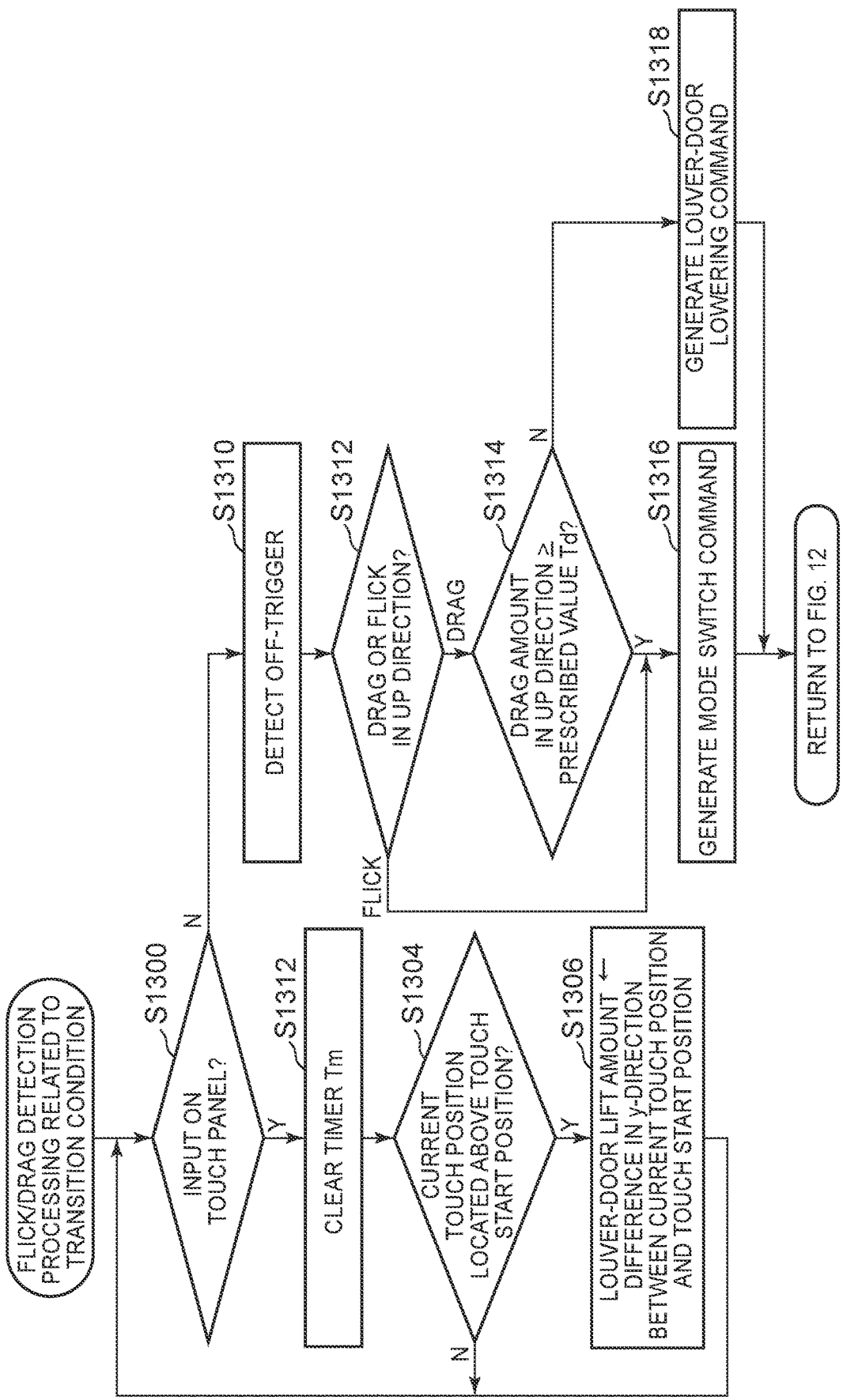
FIG. 13 is a schematic flowchart of one example of the processing that is executed by the input reception processing section 114 of the control unit 10.

Each of FIG. 12 and FIG. 13 is the schematic flowchart of the one example of the processing that is executed by the input reception processing section 114. The processing shown in FIG. 12 is executed in a specified cycle while an ignition switch is on, for example. In this embodiment, as one example, the specified cycle corresponds to the frame cycle on the lower display 4.

In step S1200, the input reception processing section 114 determines whether the current display mode is the mirror display mode. If a determination result is "YES", the process proceeds to step S1201. Otherwise (that is, if the current display mode is the independent display mode), the process proceeds to processing in FIG. 14. Note that an initial mode of the display mode (a default mode immediately after the ignition switch is turned on) is the independent display mode, for example.

In step S1201, the input reception processing section 114 determines whether the automatic animation processing is currently executed by the display control section 110. Step S1201 is executed not to accept the input during the automatic animation processing by the display control section 110. If a determination result is "YES", the current processing cycle is terminated as is. Otherwise, the process proceeds to step S1202.

In step S1202, the input reception processing section 114 determines whether the current processing cycle is an initial cycle after the transition from the independent display mode to the mirror display mode. If a determination result is "YES", the process proceeds to step S1203. Otherwise, the process proceeds to step S1204.

In step S1203, the input reception processing section 114 activates a timer Tm. The timer Tm is used to detect the above-described particular non-operational state. Once activated or cleared, the timer Tm goes off after the predetermined time T1 (for example, 20 seconds).

In step S1204, the input reception processing section 114 determines whether the operation signal is received from the mechanical switch group 6. If a determination result is "YES", the process proceeds to step S1206. Otherwise, the process proceeds to step S1220.

In step S1206, the input reception processing section 114 clears (resets) the timer Tm.

In step S1208, the input reception processing section 114 executes processing that corresponds to the received operation signal. This type of the processing is processing to response to the operation signal from the mechanical switch group 6 and as is described above.

In step S1220, the input reception processing section 114 determines whether the input on the touch panel 5 is present. Presence or absence of the input on the touch panel 5 can be determined on the basis of presence or absence of a detection signal from the touch panel 5. If a determination result is "YES", the process proceeds to step S1222. Otherwise, the process proceeds to step S1240.

In step S1222, the input reception processing section 114 clears (resets) the timer Tm.

In step S1224, the input reception processing section 114 determines whether the input on the touch panel 5 is the operation input that is associated with the defined portion. The defined portion is as described above. The determination on whether the input on the touch panel 5 is the operation input that is associated with the defined portion can be determined on the basis of the image ID related to the lower GUI image that is output onto the lower display 4 and the GUI information as shown in FIG. 6, for example. If a determination result is "YES", the process proceeds to step S1226. Otherwise, the process proceeds to step S1230.

In step S1226, the input reception processing section 114 executes processing to execute the function that is associated with the defined portion (the particular function processing). The particular function processing is as described above. Note that this type of the processing in the mirror display mode is processing to provide the operation signal, which is associated with the defined portion of the mirror display mode image output onto the lower display 4, to the multimedia system 2.

In step S1230, the input reception processing section 114 determines whether the touch start position is located on the outside of the screen of the lower display 4. If a determination result is "YES", the process proceeds to step S1232. Otherwise, the process proceeds to step S1236.

In step S1232, the input reception processing section 114 determines whether a series of the input on the touch panel 5 is input by "the edge-in in the up-direction". The edge-in in the up-direction is as described above and is a swiping operation in the up direction from the lower side on the outside of the screen of the lower display 4. If a determination result is "YES", the process proceeds to step S1234. Otherwise, the current cycle is terminated as is.

In step S1234, the input reception processing section 114 generates a mode switch command and provides the mode switch command to the display control section 110. The mode switch command is input to command the display control section 110 to switch the display mode. The processing by the display control section 110 at the time of receiving the mode switch command will be described below with reference to FIG. 16.

In step S1236, the input reception processing section 114 determines whether the touch start position is the lower end of the screen of the lower display 4. If a determination result is "YES", the process proceeds to "flick/drag detection processing related to the transition condition", which will be described below with reference to FIG. 13. Otherwise, the current processing cycle is terminated as is.

In step S1240, the input reception processing section 114 determines whether the timer Tm goes off. If a determination result is "YES", the process proceeds to step S1242. Otherwise, the current processing cycle is terminated as is.

In step S1242, the input reception processing section 114 generates a mode recovery command and provides the mode recovery command to the display control section 110. The mode recovery command is the input to command the display control section 110 to recover from the mirror display mode to the independent display mode. The processing by the display control section 110 at the time of receiving the mode recovery command will be described below with reference to FIG. 16.

FIG. 13 is a schematic flowchart of one example of the flick/drag detection processing related to the transition condition. Note that the processing shown in FIG. 13 is executed when the determination result in step S1236 of FIG. 12 is "YES". The processing shown in FIG. 13 includes a loop that is executed in every specified cycle. Once step S1316 or step S1318 is terminated, the processing returns to that from step S1200 of FIG. 12 in the next processing cycle.

In step S1300, the input reception processing section 114 determines whether the input on the touch panel 5 is present. If a determination result is "YES", the process proceeds to step S1302. Otherwise, the process proceeds to step S1310.

In step S1302, the input reception processing section 114 clears (resets) the timer Tm.

In step S1304, the input reception processing section 114 determines whether the current touch position is located above the touch start position on the basis of the touch start position and the current touch position. That is, the input reception processing section 114 determines whether y<y0. If a determination result is "YES", the process proceeds to step S1306. Otherwise, the process returns to step S1300 in the next processing cycle.

In step S1306, the input reception processing section 114 computes a difference (=y0−y) in a y-direction between the current touch position and the touch start position as a louver-door lift amount from the lower end of the screen and provides the louver-door lift amount to the display control section 110. The processing by the display control section 110 at the time of receiving the louver-door lift amount will be described below with reference to FIG. 16 and FIG. 17.

In step S1310, the input reception processing section 114 detects the off-trigger by receiving the touch position in the last processing cycle as the touch finish position.

In step S1312, the input reception processing section 114 determines (identifies) whether a series of the current input on the touch panel 5 is either the drag or the flick in the up direction. If the series of the current input on the touch panel 5 is the drag in the up direction, the process proceeds to step S1314. If the series of the current input on the touch panel 5 is the flick in the up direction, the process proceeds to step S1316.

In step S1314, the input reception processing section 114 determines whether a drag amount in the up direction (=y0−y1) is equal to or larger than a prescribed value Td. The prescribed value Td is a threshold that is related to the drag amount of the drag that satisfies the transition condition. The prescribed value Td may be equal to a vertical dimension of the screen of the lower display 4. However, as one example, the prescribed value Td is a smaller value than the vertical dimension of the screen of the lower display 4 herein and is half the vertical dimension of the screen of the lower display 4, for example. If a determination result is "YES", the process proceeds to step S1316. Otherwise, the process proceeds to step S1318.

In step S1316, the input reception processing section 114 generates the mode switch command and provides the mode switch command to the display control section 110. Once the process in step S1316 is terminated, the processing in FIG. 13 is terminated.

In step S1318, the input reception processing section 114 generates the louver-door lowering command and provides the louver-door lowering command to the display control section 110. The processing by the display control section 110 at the time of receiving the louver-door lowering command will be described below with reference to FIG. 16 and FIG. 17. Once the process in step S1318 is terminated, the processing in FIG. 13 is terminated.

According to the processing shown in FIG. 12 and FIG. 13, when the transition conditions from the mirror display mode to the independent display mode (the above-described conditions (11) to (14)) are satisfied in the mirror display mode, the mode switch command, the mode recovery command, and the like are generated and can be provided to the display control section 110. In addition, the drag or the flick in the up direction in the above-described condition (14) is limited to the drag or the flick from the lower end of the screen of the lower display 4. It is because of such an image that the louver door is accommodated on the lower side on the outside of the screen in the mirror display mode (see FIG. 8C). In this way, the user's recognition on the louver-door model can be promoted.

Figure 14:
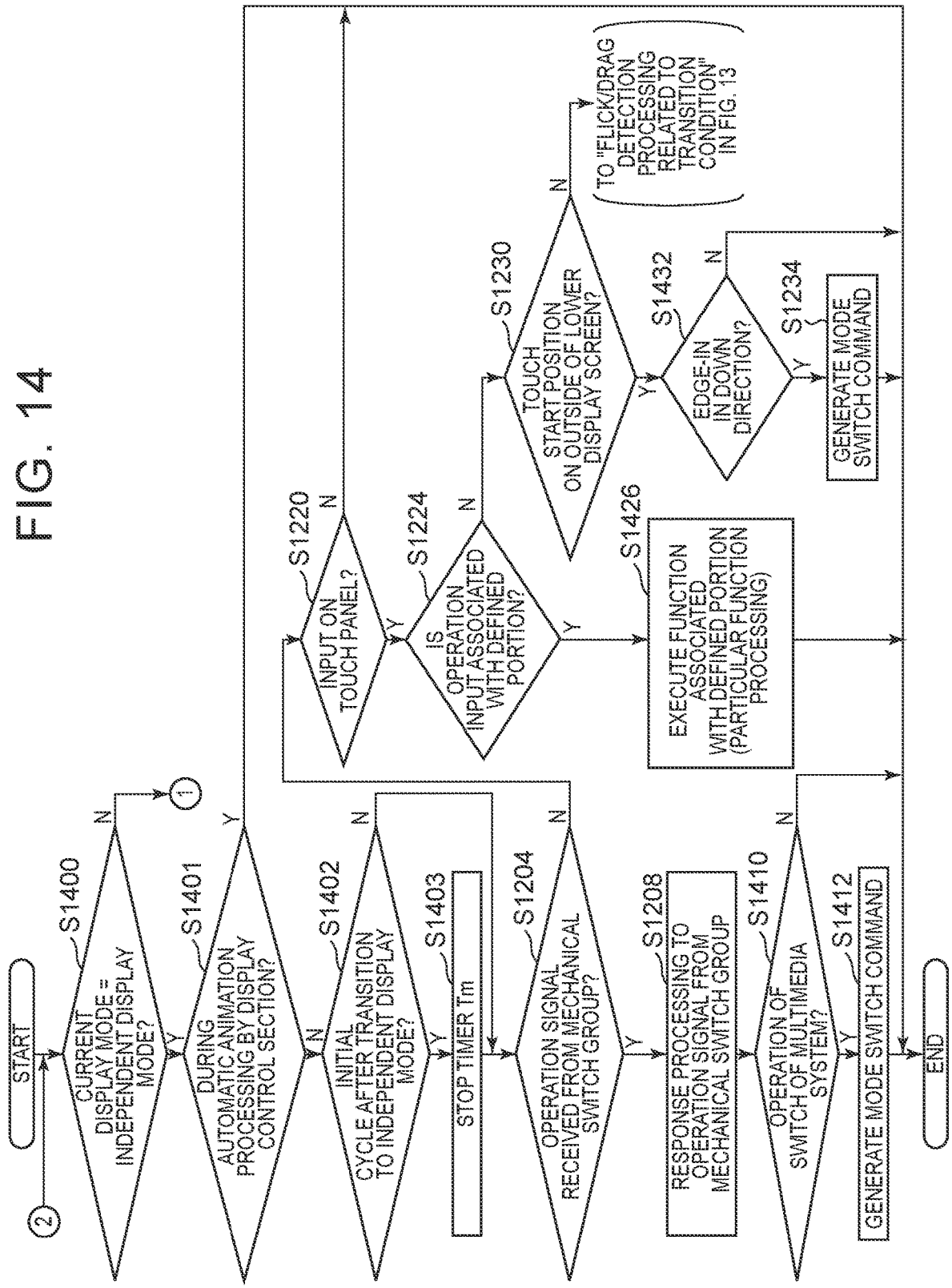
FIG. 14 is a schematic flowchart of one example of the processing that is executed by the input reception processing section 114 of the control unit 10.
Figure 15:
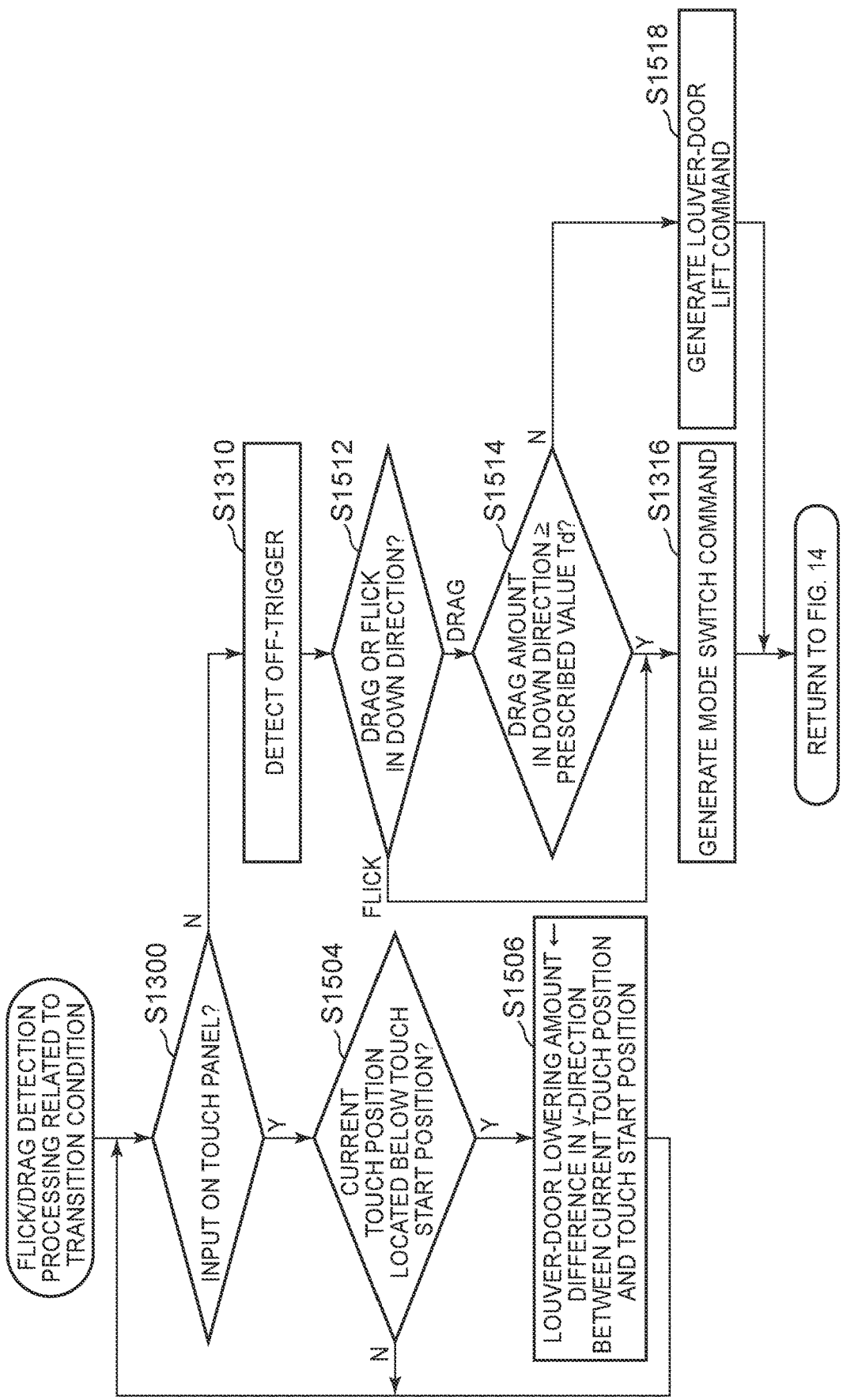
FIG. 15 is a schematic flowchart of one example of the processing that is executed by the input reception processing section 114 of the control unit 10.

Each of FIG. 14 and FIG. 15 is a schematic flowchart of one example of processing that is executed by the input reception processing section 114 together with the above-described processing shown in FIG. 12 and FIG. 13. Similar to the processing in FIG. 12, the processing shown in FIG. 14 is executed in every specified cycle.

The processing shown in FIG. 14 differs from the processing shown in FIG. 12 in points that step S1410 and step S1412 are added to the processing shown in FIG. 12 that step S1200 to step S1203, step S1226, and step S1232 are respectively replaced with step S1400 to step S1403, step S1426, and step S1432 and that step S1206, step S1222, step S1236, step S1240, and step S1242 are not provided. A description will hereinafter be made on different portions.

In step S1400, the input reception processing section 114 determines whether the current display mode is the independent display mode. If a determination result is "YES", the process proceeds to step S1401. Otherwise (that is, if the current display mode is the mirror display mode), the processing is shifted to that in FIG. 12.

In step S1401, the input reception processing section 114 determines whether the automatic animation processing is currently executed by the display control section 110. The process in step S1401 is executed not to accept the input during the automatic animation processing by the display control section 110. If a determination result is "YES", the current processing cycle is terminated as is. Otherwise, the process proceeds to step S1402.

In step S1402, the input reception processing section 114 determines whether the current processing cycle is an initial cycle after the transition from the mirror display mode to the independent display mode. If the determination result is "YES", the processing proceeds to step S1403. Otherwise, the process proceeds to step S1204.

In step S1403, the input reception processing section 114 stops the timer Tm. This is because the timer Tm is not used in the independent display mode.

In step S1410, the input reception processing section 114 determines whether the above-described condition (2) "the operation of the switch of the multimedia system in the mechanical switch group 6 is detected" is satisfied on the basis of the received operation signal. If a determination result is "YES", the process proceeds to step S1412. Otherwise, the current processing cycle is terminated as is.

In step S1412, the input reception processing section 114 generates the mode switch command and provides the mode switch command to the display control section 110.

In step S1426, the input reception processing section 114 executes the processing to execute the function that is associated with the defined portion (the particular function processing). The particular function processing is as described above. Note that this processing in the independent display mode includes provision of the display change command, which is associated with the defined portion of the independent display mode image output onto the lower display 4, to the display control section 110.

In step S1432, the input reception processing section 114 determines whether a series of the input on the touch panel 5 is input by "the edge-in in the down direction". The edge-in in the down direction is as described above and is the swiping operation in the down direction from the upper side on the outside of the screen of the lower display 4. If the determination result is "YES", the process proceeds to step S1234. Otherwise, the current processing cycle is terminated as is.

The processing shown in FIG. 15 differs from the processing shown in FIG. 13 in points that step S1304, step S1306, step S1312, step S1314, and step S1318 are respectively replaced with step S1504, step S1506, step S1512, step S1514, and step S1518 and that step S1302 is not provided. A description will hereinafter be made on different portions.

In step S1504, the input reception processing section 114 determines whether the current touch position is located below the touch start position on the basis of the touch start position and the current touch position. That is, the input reception processing section 114 determines whether y>y0. If the determination result is "YES", the process proceeds to step S1506. Otherwise, the process returns to step S1500 in the next processing cycle.

In step S1506, the input reception processing section 114 computes a difference (=y−y0) in the y-direction between the current touch position and the touch start position as a louver-door lowering amount from the upper end of the screen, and provides the louver-door lowering amount to the display control section 110. The processing by the display control section 110 at the time of receiving the louver-door lowering amount will be described below with reference to FIG. 16 and FIG. 17.

In step S1512, the input reception processing section 114 determines (identifies) whether the series of the current input on the touch panel 5 is either the drag or the flick in the down direction. If the series of the current input on the touch panel 5 is the drag in the down direction, the process proceeds to step S1514. If the series of the current input on the touch panel 5 is the flick in the down direction, the process proceeds to step S1316.

In step S1514, the input reception processing section 114 determines whether the drag amount in the down direction (=y1−y0) is equal to or larger than the prescribed value Td. The prescribed value Td is as described above. If the determination result is "YES", the process proceeds to step S1316. Otherwise, the process proceeds to step S1518.

In step S1518, the input reception processing section 114 generates a louver-door lift command and provides the louver-door lift command to the display control section 110. The processing by the display control section 110 at the time of receiving the louver-door lift command will be described below with reference to FIG. 16 and FIG. 17. Once step S1518 is terminated, the processing in FIG. 15 is terminated.

According to the processing shown in FIG. 14 and FIG. 15, when the transition conditions from the independent display mode to the mirror display mode (the above-described conditions (1) to (2)) are satisfied in the independent display mode, the mode switch command is generated and can be provided to the display control section 110. In addition, the drag or the flick in the down direction in the above-described condition (1) is not limited to the drag or the flick from the upper end of the screen of the lower display 4. This is because, as described above with reference to FIG. 7 to FIG. 8C, the louver-door model is a mental model in which the louver-door covers the entire mirror display mode image and the louver door can be lowered from any position (see FIG. 8C). In this way, the user's recognition of the louver-door model can be promoted. Note that, in the case of the roll-up-curtain model, the drag or the flick in the down direction on the touch panel 5 in the above-described condition (1) is limited to the drag or the flick in the down direction from the upper end of the screen of the lower display 4. This is because, as described above with reference to FIG. 9 to FIG. 10C, the roll-up-curtain model is a mental model in which the roll curtain is laid out in the screen by pulling down the lower edge of the roll curtain (for example, the image of the string hung from the lower edge).

Figure 16:
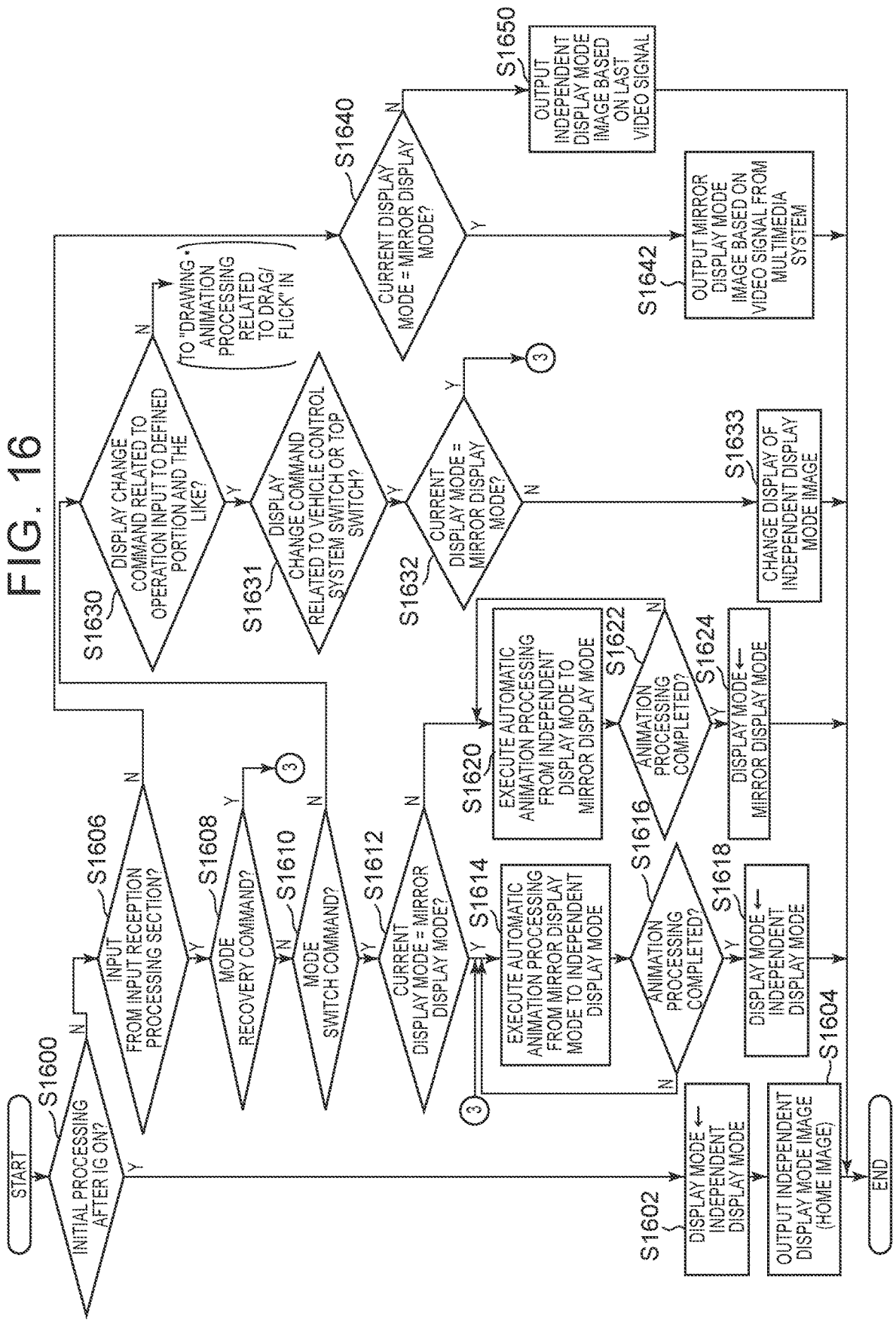
FIG. 16 is a schematic flowchart of one example of processing that is executed by a display control section 110 of the control unit 10.
Figure 17:
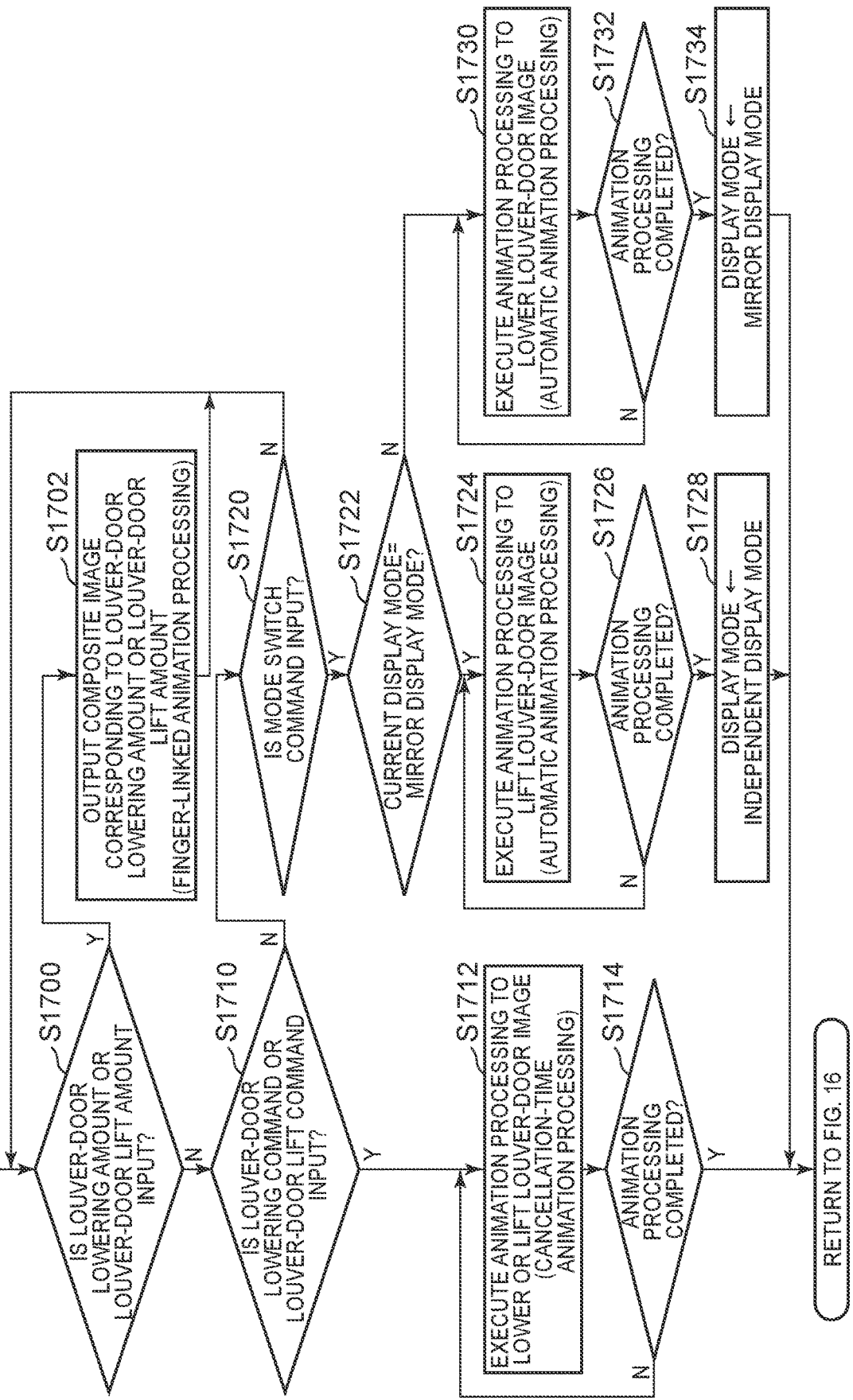
FIG. 17 is a schematic flowchart of one example of the processing that is executed by the display control section 110 of the control unit 10.

Each of FIG. 16 and FIG. 17 is a schematic flowchart of one example of processing that is executed by the display control section 110 of the control unit 10. FIG. 16 and FIG. 17 show processing that is cooperated with the above-described processing in FIG. 12 to FIG. 15. The processing shown in FIG. 16 is executed in every specified cycle while the ignition switch is on, for example. As described above, the specified cycle corresponds to the frame cycle of the lower display 4.

In step S1600, the display control section 110 determines whether the current processing is initial processing after the ignition switch is on. If a determination result is "YES", the process proceeds to step S1602. Otherwise, the process proceeds to step S1606.

In step S1602, the display control section 110 sets the display mode to the independent display mode.

In step S1604, the display control section 110 outputs the home image that is related to the independent display mode image onto the lower display 4.

In step S1606, the display control section 110 determines whether the input from the input reception processing section 114 is present. If a determination result is "YES", the processing proceeds to step S1608. Otherwise, the processing proceeds to step S1640.

In step S1608, the display control section 110 determines whether the input from the input reception processing section 114 is the mode recovery command. If the determination result is "YES", the process proceeds to step S1614. Otherwise, the process proceeds to step S1610.

In step S1610, the display control section 110 determines whether the input from the input reception processing section 114 is the mode switch command. If the determination result is "YES", the process proceeds to step S1612. Otherwise, the process proceeds to step S1630.

In step S1612, the display control section 110 determines whether the current display mode is the mirror display mode. If the determination result is "YES", the process proceeds to step S1614. Otherwise (that is, if the current display mode is the independent display mode), the process proceeds to step S1620.

In step S1614, the display control section 110 executes the automatic animation processing that precedes switching from the mirror display mode to the independent display mode on the basis of the video signal of the independent display mode image to be output after switching of the display mode and the video signal of the current upper image (the video signal obtained from the multimedia system 2). The automatic animation processing that precedes switching from the mirror display mode to the independent display mode is as described above.

For example, the display control section 110 generates the louver-door image 920 on the basis of the independent display mode image to be output after switching of the display mode, and generates the composite image from said louver-door image 920 and the image based on the video signal obtained from the multimedia system 2. Note that the independent display mode image to be output after switching of the display mode is determined as follows in accordance with an attribute of the input from the input reception processing section 114. In the case of the mode switch command and the mode recovery command, the independent display mode image to be output after switching of the display mode may be the home image or the most recent independent display mode image. Meanwhile, in the case of the display change command based on the operation signal from the mechanical switch group 6 (the vehicle control system switch or the top switch), the independent display mode image to be output after switching of the display mode is determined in accordance with said display change command. For example, in the case of the mode switch command based on the operation signal of the top switch, the independent display mode image to be output after switching of the display mode is the home image. The display control section 110 increases the louver-door image 920 in the composite image by a specified lift amount in every frame cycle, and completes the automatic animation processing when the lower image becomes the independent display mode image to be output after switching of the display mode.

In step S1616, the display control section 110 determines whether the automatic animation processing is completed. If the determination result is "YES", the process proceeds to step S1618. Otherwise, the process returns to step S1614 in the next processing cycle (that is, the automatic animation processing continues).

In step S1618, the display control section 110 sets (changes) the display mode to the independent display mode.

In step S1620, the display control section 110 executes the automatic animation processing that precedes switching from the independent display mode to the mirror display mode on the basis of the video signal related to the most recent independent display mode image and the video signal of the current upper image (the video signal obtained from the multimedia system 2). The automatic animation processing that precedes switching from the independent display mode to the mirror display mode is as described above.

For example, the display control section 110 generates the louver-door image 920 on the basis of the video signal related to the most recent independent display mode image, and generates the composite image from said louver-door image 920 and the image based on the video signal obtained from the multimedia system 2. The display control section 110 lowers the louver-door image 920 in the composite image by the specified lowering amount in every frame cycle and completes the automatic animation processing when the lower image becomes the mirror display mode image.

In step S1622, the display control section 110 determines whether the automatic animation processing is completed. If a determination result is "YES", the process proceeds to step S1624. Otherwise, the process returns to step S1620 in the next processing cycle (that is, the automatic animation processing continues).

In step S1624, the display control section 110 sets (changes) the display mode to the mirror display mode.

In step S1630, the display control section 110 determines whether the input from the input reception processing section 114 is either one of the display change command associated with the defined portion and the display change command related to the operation signal of the mechanical switch group 6. If a determination result is "YES", the process proceeds to step S1631. Otherwise, the process proceeds to "drawing • the animation processing related to the drag/the flick", which will be described below with reference to FIG. 17.

In step S1631, the display control section 110 determines whether the input from the input reception processing section 114 is the display change command related to the operation signal of either one of the vehicle control system switch and the top switch. If a determination result is "YES", the process proceeds to step S1632. Otherwise, the process proceeds to step S1633.

In step S1632, the display control section 110 determines whether the current display mode is the mirror display mode. If a determination result is "YES", the process proceeds to step S1614. Otherwise (that is, if the current display mode is the independent display mode), the process proceeds to step S1633.

In step S1633, the display control section 110 outputs the independent display mode image based on the processing result, which corresponds to the display change command, onto the lower display 4.

In step S1640, the display control section 110 determines whether the current display mode is the mirror display mode. If a determination result is "YES", the process proceeds to step S1642. If the determination result is "NO", the process proceeds to step S1650.

In step S1642, the display control section 110 outputs the mirror display mode image onto the lower display 4 on the basis of the video signal obtained from the multimedia system 2.

In step S1650, the display control section 110 outputs the independent display mode image on the basis of the video signal in the last processing cycle (the video signal related to the independent display mode image). In this way, the independent display mode image is maintained without being changed.

FIG. 17 is a schematic flowchart of one example of the drawing • the animation processing related to the flick/the drag. Note that the processing shown in FIG. 17 is executed if the determination result in step S1630 of FIG. 16 is "NO". The processing shown in FIG. 17 includes a loop that is executed in every processing cycle. When step S1714, step S1728, or step S1734 is terminated, the processing returns to that from step S1600 of FIG. 16 in the next processing cycle.

In step S1700, the display control section 110 determines whether the input from the input reception processing section 114 is either one of the louver-door lowering amount and the louver-door lift amount. If a determination result is "YES", the process proceeds to step S1702. Otherwise (that is, if the input from the input reception processing section 114 is neither the louver-door lowering amount nor the louver-door lift amount), the process proceeds to step S1710.

In step S1702, the display control section 110 outputs the composite image, in which the louver-door image 920 (FIG. 8B) is lifted or lowered by the louver-door lift amount or the louver-door lowering amount, onto the lower display 4. Note that the louver-door image 920 is generated on the basis of the video signal related to the most recent independent display mode image. This also applied to the other louver-door image 920 in the following description of FIG. 17. The finger-linked animation processing is realized when step S1702 is executed in accordance with the louver-door lift amount or the louver-door lowering amount that is changed over the plural processing cycles.

In step S1710, the display control section 110 determines whether the input from the input reception processing section 114 is either one of the louver-door lowering command and the louver-door lift command. If a determination result is "YES", the processing proceeds to step S1712. Otherwise (that is, the input from the input reception processing section 114 is neither the louver-door lowering command nor the louver-door lift command), the process proceeds to step S1720.

In step S1712, the display control section 110 executes the animation processing (hereinafter, referred to as the "cancellation-time animation processing" for distinction from the automatic animation processing and the finger-linked animation processing) to set the mirror display mode image that is obtained by completely lowering the louver-door image 920 (FIG. 8B) or the independent display mode image that is obtained by completely lifting the louver-door image 920 in response to the louver-door lowering command or the louver-door lift command as a target image and lower or lift the louver-door image 920 by the specified lowering amount or the specified lift amount in every frame cycle toward said target image.

In step S1714, the display control section 110 determines whether the cancellation-time animation processing is completed (that is, whether the lower image has become the mirror display mode image or the independent display mode image). If the determination result is "YES", the processing in FIG. 17 is terminated. Otherwise, the processing returns to step S1712 in the next processing cycle (that is, the cancellation-time animation processing continues).

In step S1720, the display control section 110 determines whether the input from the input reception processing section 114 is the mode switch command. If a determination result is "YES", the process proceeds to step S1722. Otherwise, the process returns to step S1700 in the next processing cycle.

In step S1722, the display control section 110 determines whether the current display mode is the mirror display mode. If a determination result is "YES", the process proceeds to step S1724. Otherwise (that is, if the current display mode is the independent display mode), the process proceeds to step S1730.

In step S1724, the display control section 110 executes the automatic animation processing to lift the louver-door image 920 in the composite image by the specified lift amount in every frame cycle.

In step S1726, the display control section 110 determines whether the automatic animation processing is completed (that is, whether the lower image has become the independent display mode image). If a determination result is "YES", the process proceeds to step S1728. Otherwise, the process returns to step S1724 in the next processing cycle (that is, the automatic animation processing continues).

In step S1728, the display control section 110 sets (changes) the display mode to the independent display mode. Once the process in step S1728 is terminated, the processing in FIG. 17 is terminated.

In step S1730, the display control section 110 executes the automatic animation processing to lower the louver-door image 920 in the composite image by the specified lowering amount in every frame cycle.

In step S1732, the display control section 110 determines whether the automatic animation processing is completed (that is, whether the lower image has become the mirror display mode image).

In step S1734, the display control section 110 sets (changes) the display mode to the mirror display mode. Once the process in step S1734 is terminated, the processing in FIG. 17 is terminated.

According to the processing shown in FIG. 12 to FIG. 17, on the basis of the mode switching input by the user and the particular non-operational state, switching of the display mode can be realized through the automatic animation processing based on the louver-door model. In addition, according to the processing shown in FIG. 12 to FIG. 17, in the case where the input that can be the flick or the drag satisfying the transition condition is detected, at a stage prior to making such a determination (confirmation) that said input is the flick or the drag satisfying the transition condition, the finger-linked animation processing can be executed to lift or lower the louver-door image 920 in accordance with the finger position at the time point. In this way, the louver-door image 920 moves in an interlocking manner with the finger movement. Thus, an effect obtained by the animation processing (for example, an effect of facilitating understanding of the layer relationship) can further be enhanced. In this case, when it is determined as a result that said input is not the flick or the drag satisfying the transition condition, the louver-door image 920 is returned to an original state (a state where switching of the display mode is not realized) by the louver-door lowering command or the louver-door lift command. In this way, after starting the drag (and after the louver-door image 920 starts appearing along therewith), the user can cancel unintended switching of the display mode by releasing his/her finger while the drag amount is less than the prescribed value Td.

In addition, according to the processing shown in FIG. 12 to FIG. 17, when the drag amount is equal to or larger than the prescribed value Td, the mode switch command is generated at the same time as the off-trigger, and the louver-door image 920 is drawn out of the screen by the automatic animation processing. Thus, the user can make the predetermined touch input without dragging the screen of the lower display 4 from the upper end to the lower end thereof or from the lower end to the upper end thereof.

Note that, in the processing shown in FIG. 12 to FIG. 17, in order to facilitate understanding of an interrelation between the louver-door image 920 and the finger position, the louver-door lowering amount or the louver-door lift amount that is equal to the difference in the y-direction between the current touch position and the touch start position is computed. However, the louver-door lowering amount or the louver-door lift amount may be computed by multiplying said difference by a specified ratio that is larger than 1. In this case, the mode switch command is generated on the basis of the drag (the mode switching input), from which the louver-door lowering amount or the louver-door lift amount equal to or larger than the prescribed value Td is computed, for example. Also, in this case, the user can make the predetermined touch input without dragging the screen of the lower display 4 from the upper end to the lower end thereof or from the lower end to the upper end thereof.

The detailed description has been made so far on each of the embodiments. However, the disclosure is not limited to any of the particular embodiments, and various changes or modifications can be made thereto within the scope described in the present specification. In addition, an entirety or a plurality of the components in the above-described embodiments can be combined.

Figure 18:
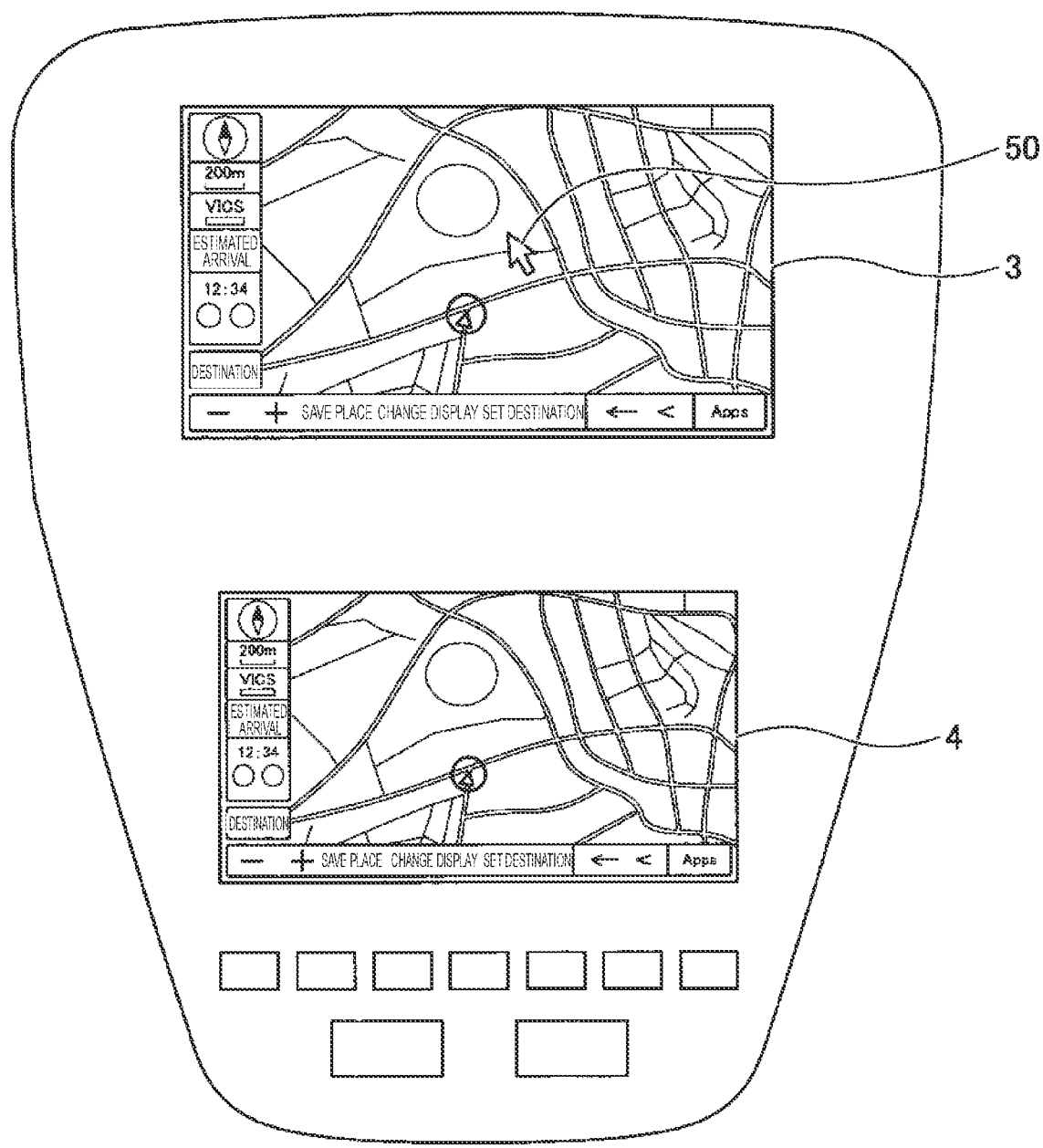
FIG. 18 is an explanatory view of one example of the mirror display mode in which a lower image has the same external appearance as an upper image.
Figure 19:
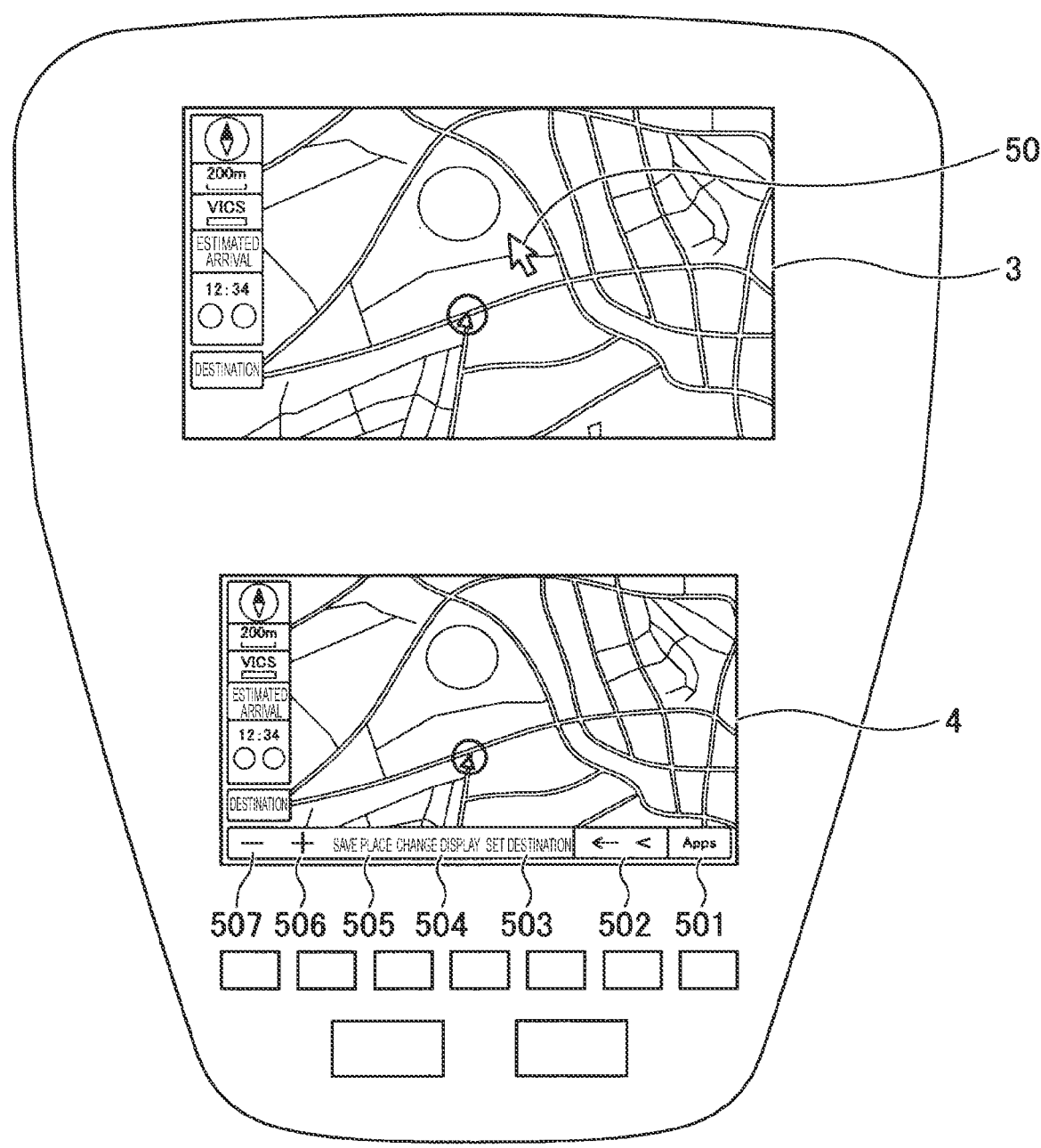
FIG. 19 is an explanatory view of another example of the mirror display mode in which the lower image has the same external appearance as an upper image.

For example, in the above-described embodiment, the mirror display mode image has the same (mirrored) external appearance as the upper image. Thus, the functions associated with the mirror display mode image (the functions related to the upper image) each have the same concept as each of the functions related to the mirror display mode image. However, the external appearance of the mirror display mode image does not have to be completely the same as that of the upper image and may be substantially the same as that of the upper image. This is because when the external appearance is substantially the same, in the mirror display mode, the user does not mix up realization of the functions related to the mirror display mode image with realization of the functions related to the upper image. An idea of having the same external appearance permits a slight difference of the external appearance, and the idea of having the same external appearance indicates such an aspect that main sections of the image have the same external appearance. Accordingly, as shown in FIG. 18, for example, such a difference that a pointer display 50 is present or absent may be accepted. More specifically, while the pointer display 50 is drawn in the upper image (the image output onto the upper display 3) shown in FIG. 18, such a pointer display 50 is not drawn in the mirror display mode image (the image output onto the lower display 4) shown in FIG. 18. In addition, the above slight difference may be such a difference that a cursor display (not shown) highlighting the operation item display in a selected state is present or absent, instead of the pointer display 50. Furthermore, the above slight difference may be such a difference that the operation item display is present or absent as shown in FIG. 19, for example. More specifically, while the operation item displays 501 to 507 are not drawn in the upper image shown in FIG. 19, the operation item displays 501 to 507 are drawn in the mirror display mode image shown in FIG. 19. Note that the pointer display 50 as shown in FIG. 18 is also drawn in the upper image in FIG. 19; however, these two combined differences also fall within the scope of the "same external appearance" as described above.

In the above-described embodiment, the display control section 110 executes the animation processing as the preferred example. However, the disclosure is not limited thereto. That is, the display control section 110 may complete switching between the independent display mode image and the mirror display mode image in the one frame cycle.

In the above-described embodiment, the upper image includes the various images used for the operation of the multimedia system 2. However, the disclosure is not limited thereto. For example, the upper image may only include the navigation image. In this case, of the various images used for the operation of the multimedia system 2, the image related to the audio device and the like may be included in the independent display mode image.

In the above-described embodiment, the upper image includes the various images used for the operation of the multimedia system 2. However, the disclosure is not limited thereto. For example, the upper image may further include an image used for an operation of a device other than the multimedia system 2 and the like. For example, the upper image may further include video of a rear camera (not shown). Note that the video of the rear camera is output at a time of assisting parking, for example, and can function as the GUI for setting of a target parking position and the like.

In the above-described embodiment, the upper display 3 and the lower display 4 are the on-board displays. However, one or each of the upper display 3 and the lower display 4 may be realized by a display of a user terminal (for example, a smartphone, a tablet, or the like) that is brought into and mounted on the vehicle. In this case, communication between the display of the one or each of the upper display 3 and the lower display 4, which is brought into the vehicle, and the control unit 10 may be realized via a wireless transceiver section (for example, a Bluetooth communication section) additively provided in the control unit 10 or may be realized by wired connection. Note that, when the upper display 3 is brought in, the upper display 3 is attached to the top of the instrument panel via an attachment, for example. Meanwhile, when the lower display 4 is brought in, the lower display 4 is held by a cradle that is mounted on a front surface of the instrument panel, for example. In this case, the attachment or the cradle is provided at a position where the upper display 3 is located higher than the lower display 4 in the up-down direction of the vehicle and that is far from the driver's seat. For example, in a modified example in which the upper display 3 is of an on-board type and the lower display 4 as the user terminal is brought into the vehicle, the operating apparatus for the vehicle that does not include the lower display 4 (an operating apparatus for the vehicle with such a configuration that the lower display 4 is not provided in the above-described operating apparatus 1 for the vehicle) cooperates with said user terminal and realizes the same functions as the above-described operating apparatus 1 for the vehicle when said user terminal is brought into the vehicle.

In the above-described embodiment, the mechanical switch group 6 is provided. However, the mechanical switch group 6 may not be provided. In addition, instead of or in addition to the mechanical switch group 6, another type of a switch that has an independent function as similar to the mechanical switch group 6 (a switch of a type other than the contact type that has a movable element) may be provided. The other type of the switch may be a switch of a pressure-sensitive film type or an electrostatic detection touch type, for example.

In the above-described embodiment, the predetermined touch input as the one example of the mode switching input does not include the operation input that is associated with the defined portion. However, in addition to the above-described specified defined portion, one or each of the independent display mode and the mirror display mode image may have a mode switch defined portion (a portion with which a display mode switch function is associated as a function that is not the above-described predetermined function). In this case, mode switch operation input (for example, the tap or the like) is associated with the mode switch defined portion. In this case, the mode switching input includes the mode switch operation input that is associated with the mode switch defined portion. Note that, when the mirror display mode image has the mode switch defined portion, for example, the display control section 110 can generate the mirror display mode image with the operation item display related to the mode switch defined portion by superimposing the operation item display related to the mode switch defined portion on the image based on the video signal from the multimedia system 2.

In this case, the upper image does not have the operation item display related to the mode switch defined portion. However, such a difference (the difference between the upper image and the mirror display mode image) falls within the scope of the "same external appearance" as described above.

In the above-described embodiment, the transition conditions as shown in FIG. 5 are used as the one example. However, the transition conditions can appropriately be modified. For example, the condition (11) may not be provided.

In the above-described embodiment, the multimedia system 2 and the control unit 10 are separately provided, and the display control section 110 and the input reception processing section 114 are realized by the control unit 10. However, the disclosure is not limited thereto. For example, of the GUI information shown in FIG. 6, information on the mirror display mode image may be stored as information on the upper image in the multimedia system 2 side, and the particular function processing related to the mirror display mode image as a part of the function of the input reception processing section 114 may be realized by computer processing in the multimedia system 2. In this case, in the mirror display mode, the computer in the multimedia system 2 executes the particular function processing related to the mirror display mode image on the basis of the detection signal from the touch panel 5 and the information on the upper image of the GUI information.

What is claimed is:

1. An operating apparatus for a vehicle comprising:
a first display having a touch panel and mounted on the vehicle;
a second display arranged at a position higher than the first display and away from a driver's seat of the vehicle compared to the first display;
an electronic control unit configured to:
output a first image onto the first display,
output a second image onto the second display,
switch between a first mode and a second mode based on a mode switching input from a user, output a first mode image independent of the second image, as the first image, when the electronic control unit is in the first mode, output a second mode image, as the first image, the second mode image having the same external appearance as the second image, when the electronic control unit is in the second mode, execute, when the electronic control unit is in the first mode, a first predetermined function related to the first mode image, based on an operation input on the touch panel, and execute, when the electronic control unit is in the second mode, a second predetermined function related to the second image, based on the operation input on the touch panel, such that the electronic control unit is configured to change the second image and the second mode image in accordance with one another.

2. The operating apparatus for the vehicle according to claim 1, wherein the mode switching input includes predetermined input on the touch panel.

3. The operating apparatus for the vehicle according to claim 1, wherein the electronic control unit is configured to execute animation processing, the animation processing including continuous output of a composite image in which one of the first mode image and the second mode image is partially hidden by the other, over plural frame cycles, the animation processing including first animation processing, the first animation processing being executed prior to switching between the first mode and the second mode, and wherein along with a lapse of time from a time point at which the first animation processing is started, the electronic control unit is configured to realize one of (i) changing the composite image over the plural frame cycles and then outputting the second mode image with gradually reducing a display range of the first mode image and gradually displaying the second mode image when the first mode image is displayed before the electronic control unit is switched between in the first mode and in the second mode, and (ii) changing the composite image over the plural frame cycles and then outputting the first mode image with gradually reducing a display range of the second mode image and gradually displaying the first mode image when the second mode image is displayed before the electronic control unit is switched between in the first mode and in the second mode.

4. The operating apparatus for the vehicle according to claim 2, wherein the predetermined input includes: first input accompanied with finger movement in a first direction; and second input accompanied with finger movement in a reverse direction from the first direction, the first input causes switching from the first mode to the second mode, and the second input causes switching from the second mode to the first mode, the electronic control unit is configured to execute animation processing to continuously output a composite image over plural frame cycles, the composite image having: a part of the first mode image in the first direction from a boundary extending perpendicularly to the first direction; and a part of the second mode image in the reverse direction from the boundary, the boundary being on the composite image, and the animation processing includes second animation processing to change the composite image, over the plural frame cycles, in an aspect that the boundary in the composite image moves in the first direction or the reverse direction in an interlocking manner with the finger movement in the first direction or with the finger movement in the reverse direction, on the touch panel.

5. The operating apparatus for the vehicle according to claim 3, wherein the animation processing is based on: a door model or a shutter model in which the first mode image makes translational movement, within a screen of the first display or out of the screen, while adopting an first aspect of a door or a shutter, the first aspect at least covering a part of the second mode image; or a roll-up-curtain model in which the second mode image is expanded within the screen or rolled up to the outside of the screen, while adopting an second aspect of a roll curtain, the second aspect at least covering a part of the first mode image.

6. The operating apparatus for the vehicle according to claim 1, wherein the electronic control unit is configured to switch from the second mode to the first mode, when the electronic control unit is in the second mode and the operation input is not made on the second mode image for a predetermined time or longer.

7. The operating apparatus for the vehicle according to claim 1, wherein the electronic control unit is configured to generate the second mode image based on a video signal generated by the electronic control unit.

8. The operating apparatus for the vehicle according to claim 1, wherein the second display does not have a touch panel.

9. The operating apparatus for the vehicle according to claim 4, wherein the first direction is an up direction or a down direction in a vehicle up-down direction of the vehicle.

10. The operating apparatus for the vehicle according to claim 1, wherein the second image includes a navigation image.

11. The operating apparatus for the vehicle according to claim 1, wherein:

the operation input on the touch panel is an input provided by the user onto the first image, and the electronic control unit is configured to execute, when the electronic control unit is in the second mode, a second predetermined function related to the second image and the second mode image, based on the operation input on the touch panel.

* * * * *